(12) United States Patent
Cheraghi et al.

(10) Patent No.: US 11,930,514 B2
(45) Date of Patent: Mar. 12, 2024

(54) POSITION-AWARE RESOURCE ALLOCATION FOR A WIRELESS IN-VEHICLE NETWORK

(71) Applicant: QUALCOMM Incorporated, San Diego, CA (US)

(72) Inventors: Parisa Cheraghi, Cambridge (GB); Gene Wesley Marsh, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 17/354,512

(22) Filed: Jun. 22, 2021

(65) Prior Publication Data

US 2021/0410134 A1 Dec. 30, 2021

Related U.S. Application Data

(60) Provisional application No. 63/044,793, filed on Jun. 26, 2020.

(51) Int. Cl.
*H04W 72/04* (2023.01)
*H04W 4/48* (2018.01)
*H04W 72/0453* (2023.01)
*H04W 72/51* (2023.01)
*H04W 72/541* (2023.01)

(52) U.S. Cl.
CPC .............. *H04W 72/51* (2023.01); *H04W 4/48* (2018.02); *H04W 72/0453* (2013.01); *H04W 72/541* (2023.01)

(58) Field of Classification Search
None
See application file for complete search history.

(56) References Cited

U.S. PATENT DOCUMENTS

| 11,208,114 | B2* | 12/2021 | Kondo | B60W 40/10 |
| 2017/0118324 | A1* | 4/2017 | Yoganathan | H04W 4/80 |
| 2019/0096215 | A1* | 3/2019 | Shahid | G06V 10/56 |
| 2019/0228757 | A1* | 7/2019 | Chwioko | G10K 11/1754 |
| 2019/0315373 | A1* | 10/2019 | Kondo | B60W 30/095 |
| 2019/0384383 | A1* | 12/2019 | Lee | G06F 3/011 |
| 2021/0192867 | A1* | 6/2021 | Fang | G07C 5/008 |
| 2021/0307029 | A1* | 9/2021 | Uchiyama | H04W 72/0446 |
| 2021/0314930 | A1* | 10/2021 | Uchiyama | H04W 72/042 |
| 2021/0352599 | A1* | 11/2021 | Kusashima | H04B 7/0617 |
| 2022/0161744 | A1* | 5/2022 | Vangoethem | G06F 9/5077 |

* cited by examiner

*Primary Examiner* — Kodzovi Acolatse
(74) *Attorney, Agent, or Firm* — Holland & Hart LLP

(57) ABSTRACT

Methods, systems, and devices for wireless communications are described. In some systems, a vehicle may identify a set of zones of the vehicle, each zone including a number of components connected to a wireless in-vehicle network of the vehicle. A scheduler of the vehicle may associate a different set of frequency resources to each zone of the vehicle and may allocate frequency resources to each component of the vehicle from the set of frequency resources associated with the zone in which the component is located. The scheduler may associate the different sets of frequency resources with the different zones of the vehicle such that two zones that are located at opposite sides or ends of the vehicle may be associated with sets of frequency resources that are spaced in frequency from each other by a maximum frequency spacing.

30 Claims, 12 Drawing Sheets

POSITION-AWARE RESOURCE ALLOCATION FOR A WIRELESS IN-VEHICLE NETWORK

CROSS REFERENCE

The present Application for Patent claims the benefit of U.S. Provisional Patent Application No. 63/044,793 by CHERAGHI et al., entitled "POSITION-AWARE RESOURCE ALLOCATION FOR A WIRELESS IN-VEHICLE NETWORK," filed Jun. 26, 2020, assigned to the assignee hereof, and expressly incorporated by reference herein.

FIELD OF TECHNOLOGY

The following relates generally to wireless communications and more specifically to position-aware resource allocations for a wireless in-vehicle network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a vehicle may use a number of electronic control units to support a variety of features and applications of the vehicle, each electronic control unit associated with a number of components. As vehicles support a greater number of features and applications, the number of components that the vehicle may use may likewise increase, resulting in expensive and complex wiring infrastructures.

SUMMARY

The described techniques relate to improved methods, systems, devices, and apparatuses that support position-aware resource allocations for a wireless in-vehicle network. Generally, the described techniques provide for reducing the influence that inter-vehicle interference may have on wireless components of a wireless in-vehicle network by allocating frequency resources to the wireless components of a vehicle based on the location of the components on or in the vehicle. For example, a scheduler of a vehicle may identify or otherwise determine a number of different zones of the vehicle, each zone corresponding to a set of locations or a region of the vehicle including a number of components, and may allocate or otherwise associate different portions of a total frequency allocation of the vehicle to each different zone of the vehicle. Accordingly, the scheduler may allocate frequency resources to the components in a zone from the portion of the total frequency allocation of the vehicle that is associated with the zone.

In some examples, the scheduler may distribute the portions of the total frequency allocation of the vehicle to the different zones such that zones that are on opposite sides or ends of the vehicle relative to each other are allocated frequency resources that are spaced by a maximum amount of frequency or bandwidth. For example, a first zone may be associated with a right-hand side of the vehicle and a second zone may be associated with a left-hand side of the vehicle, and the scheduler may allocate resources to the components located in the first zone from a first set of frequency resources (e.g., a first portion of the total frequency allocation of the vehicle) and may allocate resources to the components located in the second zone from a second set of frequency resources (e.g., a second portion of the total frequency allocation of the vehicle) that is offset in frequency from the first set of frequency resources by a maximum frequency spacing.

As such, in examples in which two or more vehicles are in close proximity to each other while oriented in the same direction, the zones of the different vehicles that are nearest each other (e.g., the right-hand side of a first vehicle and the left-hand side of a second vehicle) may include components that are allocated frequency resources from sets of frequency resources that are separated in frequency by a maximum frequency spacing. In examples in which two vehicles may become in close proximity to each other (e.g., within a threshold distance) while oriented in opposite directions, the vehicles may exchange signaling to coordinate on which of the two vehicles may change or switch the frequency resources that are allocated to components of each zone.

For example, a first vehicle and a second vehicle may be oriented in opposite directions such that the left-hand sides or the right-hand sides of the two vehicles may be nearest each other and, in some implementations, the first vehicle or the second vehicle may determine to switch the set of frequency resources allocated to components on the right-hand side of the vehicle and the set of frequency resources allocated to components on the left-hand side of the first vehicle. As such, the components of the first vehicle that may be nearest to components of the second vehicle may use frequency resources from a set of frequency resources that is offset by a maximum frequency spacing from the set of frequency resources used by the components of the second vehicle. Accordingly, vehicles implementing the described techniques may achieve a maximum frequency spacing between wireless components of different vehicles that may be nearest each other, which may reduce the potential for inter-vehicle interference in a wireless in-vehicle network.

A method of wireless communications at a device is described. The method may include identifying a set of zones of a first vehicle, identifying a first component of the first vehicle located in a first zone of the set of zones, where the first component is configured for wireless transmissions within a wireless in-vehicle network of the first vehicle, identifying a first set of frequency resources associated with the first zone, and allocating a first frequency resource from the first set of frequency resources to the first component for wireless transmissions within the wireless in-vehicle network based on the first component being in the first zone.

An apparatus for wireless communications at a device is described. The apparatus may include a processor, memory coupled with the processor, and instructions stored in the memory. The instructions may be executable by the processor to cause the apparatus to identify a set of zones of a first vehicle, identify a first component of the first vehicle located in a first zone of the set of zones, where the first component is configured for wireless transmissions within a wireless in-vehicle network of the first vehicle, identify a first set of frequency resources associated with the first zone, and allocate a first frequency resource from the first set of frequency resources to the first component for wireless transmissions within the wireless in-vehicle network based on the first component being in the first zone.

Another apparatus for wireless communications at a device is described. The apparatus may include means for identifying a set of zones of a first vehicle, identifying a first component of the first vehicle located in a first zone of the set of zones, where the first component is configured for wireless transmissions within a wireless in-vehicle network of the first vehicle, identifying a first set of frequency resources associated with the first zone, and allocating a first frequency resource from the first set of frequency resources to the first component for wireless transmissions within the wireless in-vehicle network based on the first component being in the first zone.

A non-transitory computer-readable medium storing code for wireless communications at a device is described. The code may include instructions executable by a processor to identify a set of zones of a first vehicle, identify a first component of the first vehicle located in a first zone of the set of zones, where the first component is configured for wireless transmissions within a wireless in-vehicle network of the first vehicle, identify a first set of frequency resources associated with the first zone, and allocate a first frequency resource from the first set of frequency resources to the first component for wireless transmissions within the wireless in-vehicle network based on the first component being in the first zone.

Some examples of the method, apparatuses, and non-transitory computer-readable medium described herein may further include operations, features, means, or instructions for identifying a second component located in a second zone of the set of zones of the first vehicle, where the second component may be configured for wireless transmissions within the wireless in-vehicle network of the first vehicle, identifying a second set of frequency resources associated with the second zone, and allocating a second frequency resource from the second set of frequency resources to the second component for wireless transmissions within the wireless in-vehicle network based on the second component being in the second zone.

In some examples of the method, apparatuses, and non-transitory computer-readable medium described herein, the second zone may be located at an opposite location of the first vehicle relative to the first zone, and where identifying the second set of frequency resources associated with the second zone may include operations, features, means, or instructions for determining a maximum frequency spacing between the first set of frequency resources and the second set of frequency resources based on a frequency allocation for the first vehicle and a quantity of the set of zones of the first vehicle, and identifying the second set of frequency resources based on the maximum frequency spacing.

In some examples of the method, apparatuses, and non-transitory computer-readable medium described herein, identifying the first set of frequency resources associated with the first zone may include operations, features, means, or instructions for identifying a frequency allocation for the first vehicle and a quantity of the set of zones of the first vehicle, and partitioning the frequency allocation into a number of sets of frequency resources, where the number may be equal to the quantity of the set of zones of the first vehicle and each set of frequency resources of the number of sets of frequency resources may be associated with a zone of the set of zones of the first vehicle.

Some examples of the method, apparatuses, and non-transitory computer-readable medium described herein may further include operations, features, means, or instructions for determining a first identifier associated with the first component, and determining that the first component may be located in the first zone of the first vehicle based on the first identifier and a mapping.

Some examples of the method, apparatuses, and non-transitory computer-readable medium described herein may further include operations, features, means, or instructions for receiving, from the first component, a message including the first identifier, where determining the first identifier associated with the first component may be based on the message.

Some examples of the method, apparatuses, and non-transitory computer-readable medium described herein may further include operations, features, means, or instructions for determining that a second zone of a second vehicle may be associated with a second set of frequency resources within a threshold frequency range of the first set of frequency resources associated with the first zone of the first vehicle, determining that the second zone of the second vehicle may be within a threshold distance of the first zone of the first vehicle, and communicating an interference coordination message with the second vehicle based on determining that the second set of frequency resources associated with the second vehicle may be within the threshold frequency range of the first set of frequency resources and that the second zone of the second vehicle may be within the threshold distance of the first zone.

Some examples of the method, apparatuses, and non-transitory computer-readable medium described herein may further include operations, features, means, or instructions for switching the set of frequency resources associated with the first zone from the first set of frequency resources to a third set of frequency resources based on the interference coordination message, and allocating a third frequency resource from the third set of frequency resources to the first component.

Some examples of the method, apparatuses, and non-transitory computer-readable medium described herein may further include operations, features, means, or instructions for identifying the third set of frequency resources based on a maximum frequency spacing between the first set of frequency resources and the third set of frequency resources.

Some examples of the method, apparatuses, and non-transitory computer-readable medium described herein may further include operations, features, means, or instructions for refraining from switching the first set of frequency resources.

In some examples of the method, apparatuses, and non-transitory computer-readable medium described herein, the device communicates with the first component of the first vehicle using the wireless in-vehicle network according to a frequency division multiplexing communication technique.

In some examples of the method, apparatuses, and non-transitory computer-readable medium described herein, the first component includes a sensor, a camera, a streaming unit, or a radar device of the first vehicle.

DETAILED DESCRIPTION

Figure 1:
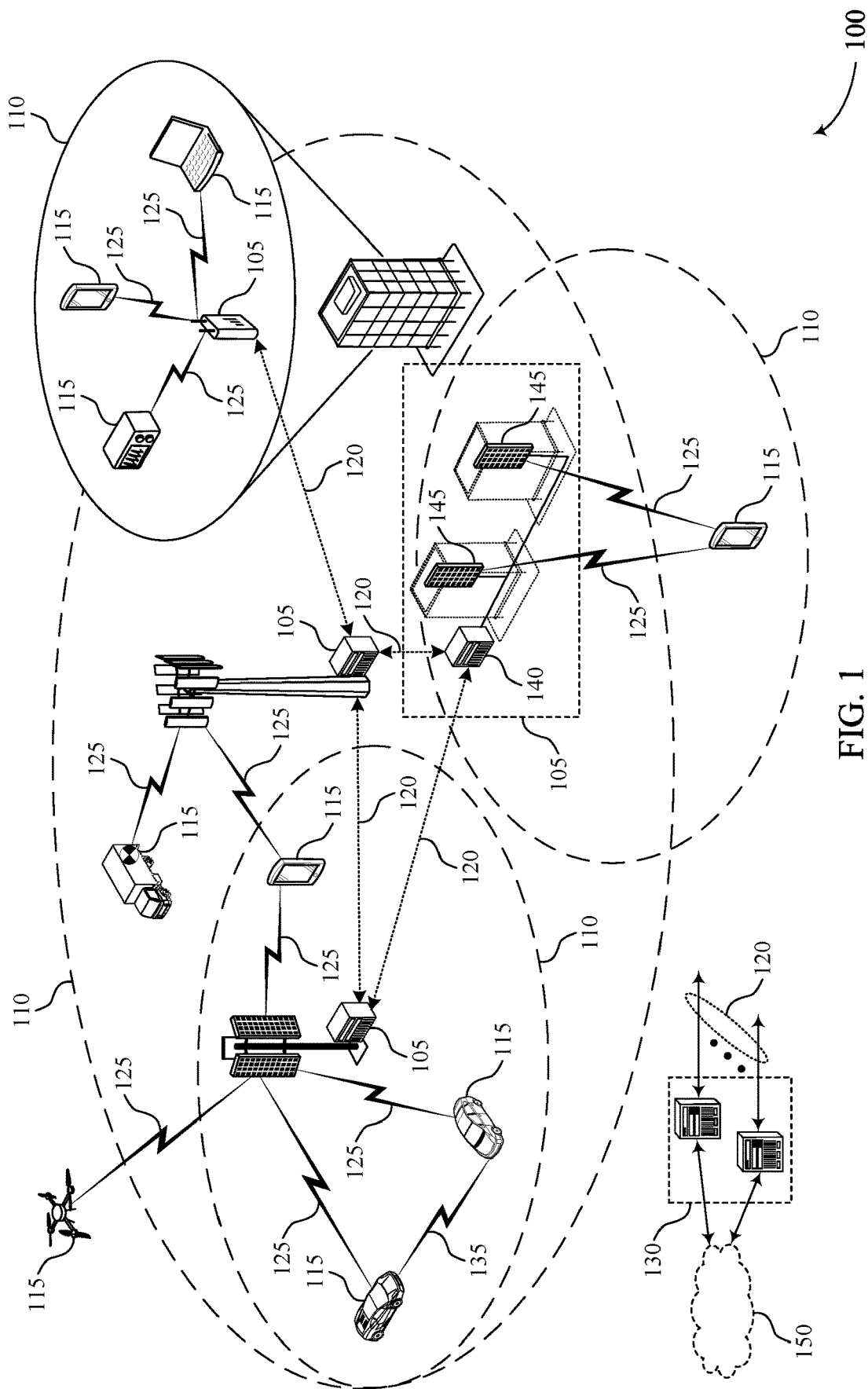
FIG. 1 illustrates an example of a wireless communications system that supports position-aware resource allocations for a wireless in-vehicle network in accordance with aspects of the present disclosure.

A vehicle may use a number of electronic control units to support a variety of features and applications of the vehicle. For example, some features or applications that a vehicle may support include driver assistance features, safety features, and infotainment services or applications. Each electronic control unit may be associated with a network of components, such as sensors, cameras, streaming units, and radars, that may be distributed throughout the vehicle. In some cases, a network of components may communicate with an associated electronic control unit via wired connections. As vehicles support a greater number of features and applications, however, the number of electronic control units and components that the vehicle may use to support such features and applications may likewise increase, which may result in expensive and complex wiring infrastructures to support communications between an electronic control unit and an associated network of inter-connected components. As such, some vehicles may use wireless components that may communicate with an electronic control unit or other components of the vehicle wirelessly as part of a wireless in-vehicle network, which may reduce the cost and complexity of the wiring infrastructure of the vehicle. In some cases, however, wireless components may experience inter-vehicle interference if other, nearby vehicles are also using wireless components, which may result in a lower likelihood for successful data reception at the electronic control units or the central units of the vehicle. For example, inter-vehicle interference may result in the reception of incorrect or corrupted data by electronic control units from associated sensors and cameras, which may cause the vehicle to make sub-optimal driving decisions, to erroneously activate safety features, or to erroneously start, stop, or change an infotainment service.

In some implementations of the present disclosure, a scheduler of the vehicle may allocate frequency resources to different wireless components of the vehicle based on the position of the wireless components on the vehicle to mitigate the influence of inter-vehicle interference. In some examples, the scheduler may identify a total frequency allocation of the vehicle, distribute portions of the frequency allocation to different zones (e.g., regions or locations) of the vehicle, and allocate frequency resources to the wireless components of the vehicle based on which zone of the vehicle the wireless components are located in. For example, the scheduler may identify that a first component is located in a first zone of the vehicle that is associated with (e.g., allocated) a first set of frequency resources and may allocate a frequency resource from the first set of frequency resources to the first component based on the first component's location in the first zone. Similarly, the scheduler may identify that a second component is located in a second zone of the vehicle that is associated with a second set of frequency resources and may allocate a frequency resource from the second set of frequency resources to the second component based on the second component's location in the second zone.

In some examples, the scheduler may distribute resource allocations to the different zones of the vehicle such that zones that are on opposite sides or ends of the vehicle (e.g., a zone associated with a right-hand side of the vehicle and a zone associated with a left-hand side of the vehicle or a zone associated with the front-end of the vehicle and a zone associated with the back-end of the vehicle) are allocated sets of frequency resources that are separated by a maximum frequency spacing. As such, in examples in which two vehicles (e.g., two vehicles using the same frequency allocation) are nearby and driving or otherwise oriented in the same direction, the zones of the two vehicles that are nearest each other (e.g., the right-hand side of a first vehicle and the left-hand side of a second vehicle or the front-end of a first vehicle and the back-end of a second vehicle) may include components that use frequency resources that are separated by a maximum amount of frequency or bandwidth, which may reduce the influence of inter-vehicle interference on the wireless components located in the zones of the two vehicles that are nearest each other.

In some implementations, a vehicle implementing the described techniques may adaptively switch the sets of frequency resources associated with each zone of the vehicle. As such, vehicles that initially allocate frequency resources in the same manner (e.g., both initially allocate the same or a similar set of frequency resources to zones associated with the right-hand sides and the left-hand sides of the vehicles) and that are driving or otherwise oriented in the opposite direction may avoid interfering with each other based on one of the vehicles adaptively switching at least the set of frequency resources associated with the zone that is or will become nearest to a potentially interfering zone of the other vehicle. For example, in examples in which the right-hand side and the left-hand side of a vehicle are allocated sets of frequency resources that are spaced by a maximum amount of frequency resources, the vehicle may switch the frequency allocation of the zone associated with the right-hand side of the vehicle with the frequency allocation associated with the left-hand side of the vehicle to achieve a maximum frequency spacing between the two nearest zones of the oppositely-oriented vehicles.

Particular aspects of the subject matter described herein may be implemented to realize one or more potential advantages. The described techniques may be implemented by a first vehicle (e.g., a scheduler of the first vehicle) to achieve a maximum (or relatively greater than that which may be achieved implementing other techniques) frequency spacing between a first set of frequency resources used by wireless components of the first vehicle and a second set of frequency resources used by proximate wireless components of a second vehicle. The first vehicle and the second vehicle may reduce the influence of inter-vehicle interference based on allocating the wireless components of the first vehicle and the second vehicle that may become nearest to each other frequency resources that are spaced in frequency by a maximum amount from each other. For example, in examples in which wireless components of two different vehicles are nearby each other and use sufficiently separated frequency resources, frequency leaking or borderline spectrum usage at one or both vehicles may be unlikely to interfere with the wireless in-vehicle network of either vehicle, which may result in improved driving assistance features, safety features, or infotainment features of the vehicle. Further, based on implementing the described techniques, vehicles may passively manage inter-vehicle interference without additional signaling or complex coordination techniques involving multiple vehicles, which may reduce design complexity and result in greater spectral efficiency. Additionally, vehicles may avoid or reduce their use of directional transmissions and beamforming techniques based on implementing the described techniques, which may lower an initial hardware cost as well as a power draw (e.g., a fuel cost) during operation.

Aspects of the disclosure are initially described in the context of wireless communications systems. Aspects of the disclosure are additionally described in the context of a wireless in-vehicle network, inter-vehicle interference avoidance schemes, and a process flow. Aspects of the disclosure are further illustrated by and described with reference to apparatus diagrams, system diagrams, and flowcharts that relate to position-aware resource allocations for a wireless in-vehicle network.

FIG. 1 illustrates an example of a wireless communications system 100 that supports position-aware resource allocations for a wireless in-vehicle network in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both. In some examples, the vehicles may support wireless in-vehicle networks and may allocate wireless communication resources (e.g., time and frequency resources) to a number of wireless components of the vehicle.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the UEs 115 of the wireless communications system 100 may be examples of vehicles capable of wireless communications to different entities (e.g., to base stations 105 or other UEs 115) as well as self-contained wireless communications. For example, the wireless communications system 100 may include vehicles that support wireless in-vehicle networks such that various components of a vehicle (e.g., sensors, cameras, streaming units, radars, etc.) may communicate with each other or with associated electronic control units or central units of the vehicle wirelessly. A vehicle may be associated with a resource allocation (e.g., a total resource allocation, such as a frequency allocation) and a scheduler of the vehicle may allocate resources from the resource allocation to the components of the vehicle that are powered on and capable of wireless communications.

In some implementations of the present disclosure, the scheduler may identify a set of zones of the vehicle and associate (e.g., allocate) sets of frequency resources from the total resource allocation to each zone of the vehicle. Accordingly, the scheduler may allocate frequency resources to each component of the vehicle based on the zone in which the component is located and the number of other components located in the same zone (e.g., to determine a bandwidth size). In some examples, the scheduler may distribute the sets of frequency resources from the total resource allocation of the vehicle to each zone of the vehicle such that zones that are associated with opposite sides or ends of the vehicle are allocated frequency resources that are spaced by a maximum frequency spacing, which the scheduler may determine based on the total resource allocation of the vehicle, the quantity of zones of the vehicle, and the number of pairs of opposite sides of the vehicle. Accordingly, in examples in which multiple nearby vehicles allocate the same or similar frequency resources to the same or similar zones, the wireless components of each vehicle nearest to another vehicle may experience or cause less inter-vehicle interference because the components (e.g., the components of different vehicles) that are nearest each other may communicate using resources that are sufficiently separated in frequency from each other.

Figure 2:
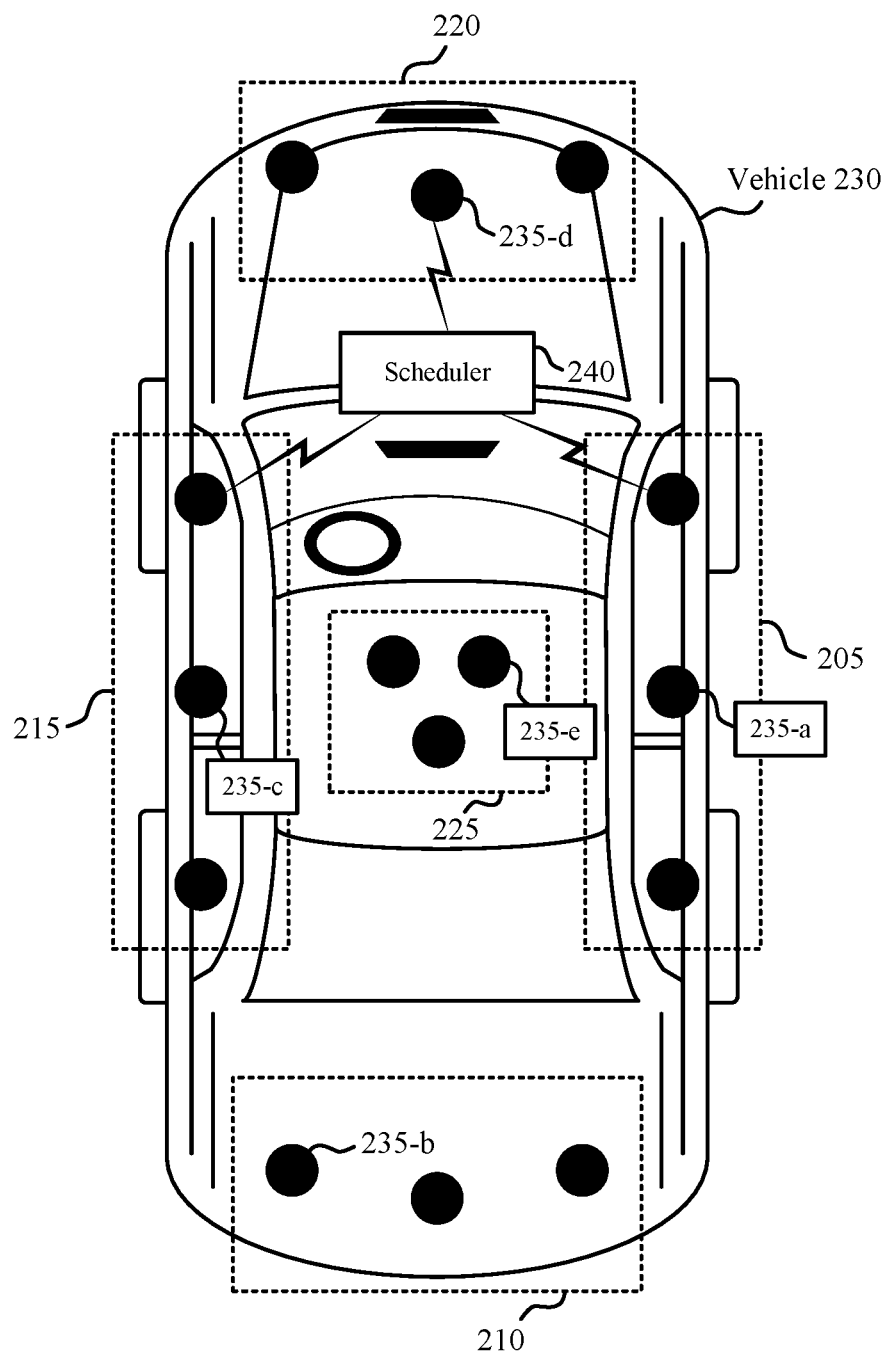
FIG. 2 illustrates an example of a wireless in-vehicle network that supports position-aware resource allocations for a wireless in-vehicle network in accordance with aspects of the present disclosure.

FIG. 2 illustrates an example of a wireless in-vehicle network 200 that supports position-aware resource allocations for a wireless in-vehicle network in accordance with aspects of the present disclosure. In some examples, the wireless in-vehicle network 200 may implement aspects of the wireless communications system 100. The wireless in-vehicle network 200 may be included within a vehicle 230, which may include a number of components 235 and a scheduler 240. In some examples, the scheduler 240 of the vehicle 230 may allocate different sets of frequency resources (e.g., different portions of a total resource allocation of the vehicle 230) to each zone of the vehicle 230, which may include a zone 205, a zone 210, a zone 215, a zone 220, and a zone 225.

The components 235 of the vehicle 230 may support a number of different features and applications of the vehicle 230 and the components 235 may be examples of distributed networks of sensors, cameras, streaming units, radars, or any other components 235 that may be applied to or used by the vehicle 230 and that may communicate with one or more associated electronic control units. The components 235 may support automotive electronics applications, such as advanced driver assistance, safety features, infotainment services, or any other application or feature that the vehicle 230 may be capable of supporting. For example, the vehicle 230 may be equipped with a number of sensors, cameras, and other devices that may enable the vehicle 230 to detect and sense the environment and objects around the vehicle 230 for driver assistance or autonomous driving experience features.

In some cases, the interconnection of the components 235 within the vehicle 230 may be wired, which may impose or otherwise result in an extensive and complex wiring infrastructure within the vehicle 230. Such a wiring infrastructure may result in an increase in the overall weight of the vehicle 230, a reduction in a fuel efficiency of the vehicle 230 (e.g., due to the increased overall weight of the vehicle 230), an increase in the number of production steps to build the vehicle 230, an increase in design complexity of the vehicle 230, an increase in the amount and cost of labor for manufacturing and installation of the wiring harness, and more complex vehicle service and repair procedures. For example, such a wiring infrastructure may weigh up to or approximately 60 kilograms and may be the third most expensive and heaviest system of the vehicle 230 after the engine and the chassis.

As such, reducing the amount of wiring used to connect the components 235 may save time and cost when building the vehicle 230 and improve fuel efficiency when the vehicle 230 is operating. To reduce the amount of wires in the harness of the wiring infrastructure, the vehicle 230 may support a number of components 235 that are capable of wireless communications (e.g., the components 235 may be wireless components 235 and may be equipped or configured with one or more antennas that the components 235 may use to communicate). For example, the vehicle 230 may support the wireless in-vehicle network 200 including the number of components 235 that may communicate with each other, associated electronic control units, or the scheduler 240 via wireless communication links. Such use of the wireless in-vehicle network 200 may save cost, improve fuel efficiency, and increase the design flexibility of the vehicle 230.

In some cases, however, wireless transmissions from the components 235 may experience inter-vehicle interference if nearby vehicles are also using a wireless in-vehicle network (e.g., also have components 235 that are capable of wireless communications) and using the same or a similar frequency band that is used by the vehicle 230. For example, if another vehicle is within a threshold distance of the vehicle 230 (e.g., within close proximity) and is using the same or a similar frequency band as the vehicle 230, the wireless transmissions within the wireless in-vehicle network 200 may experience inter-vehicle interference that may adversely influence the likelihood for successful or accurate data reception at the processing units of the vehicle 230, which may result in unreliable features and applications, such as sub-optimal driving decisions, of the vehicle 230. Further, the components 235 of the vehicle 230 may be associated with a strict reliability condition. For example, when the vehicle 230 is in a driving mode, incorrect or corrupt data that is received from components 235 (e.g., sensors or cameras) as a result of inter-vehicle interference may lead to poor and potentially harmful driving decisions made by the processing units of the vehicle 230.

In some implementations of the present disclosure, the scheduler 240 may reduce the influence of inter-vehicle interference on the wireless in-vehicle network 200 of the vehicle 230 by allocating frequency resources to the components 235 based on the physical position or location of the components 235 on or in the vehicle 230. In some examples, the scheduler 240 may determine the position or location of the components 235 based on receiving signaling from each of the components 235 (e.g., as the components 235 are powered on or during normal operation) that includes an identifier associated with the component 235. For example, the scheduler 240 may receive a message from a component 235 including an identifier of the component 235 and the scheduler 240 may determine the location of the component 235 based on the identifier and a mapping. In some examples, the scheduler 240 may determine the mapping based on using a table or a database to map the identifier (e.g., an input into the table or the database) to a location on the vehicle 230 (e.g., an output of the table or the database). Accordingly, the scheduler 240 may allocate a frequency resource to the component 235 based on the determined location of the component 235 (e.g., based on which zone of the vehicle the component 235 is located in).

For example, the scheduler 240 may minimize or reduce the impact of inter-vehicle interference, which may improve the reliability of data transmitted in the wireless in-vehicle network 200, by associating different frequency resources (e.g., different channels or subcarriers) to different zones of the vehicle 230 including the determined locations of the components 235. In some implementations, the vehicle 230 may support air-interfaces including Wi-Fi, NR, LTE, ultra-wideband (UWB), a wireless personal area network (WPAN), or any combination thereof, and may implement or otherwise use OFDM communication techniques (e.g., which may be based on the use of FDM technology) to provide additional degrees of freedom (e.g., flexibility) at the scheduler 240 to allocate different frequency channels to different zones of the vehicle 230. For example, based on using OFDM symbols, the scheduler 240 may enable different components 235 of the vehicle 230 to communicate at the same time over different frequency resources. In some examples, the vehicle 230 may have a total frequency allocation of 1024 subcarriers or channels and the scheduler 240 may associate the 1024 subcarriers or channels to the different zones of the vehicle 230. Accordingly, the scheduler 240 may allocate frequency resources for the components 235 based on the zones in which the components 235 are located, which the scheduler 240 may determine based on the identifier associated with each component 235 and the table or database.

In some examples, the vehicle 230 may include five zones, including the zone 205, the zone 210, the zone 215, the zone 220, and the zone 225, and may associate each of the five zones with a different set of frequency resources (e.g., a different frequency region or bandwidth) from the total frequency allocation of the vehicle 230. As such, the scheduler 240 may allocate frequency resources to the components 235 within a zone from the set of frequency resources associated with that zone. For instance, the scheduler 240 may associate a first set of frequency resources with the zone 205, a second set of frequency resources with the zone 210, a third set of frequency resources with the zone 215, a fourth set of frequency resources with the zone 220, and a fifth set of frequency resources with the zone 225. Accordingly, the scheduler 240 may allocate a first frequency resource from the first set of frequency resources to the component 235-$a$ located in the zone 205, a second frequency resource from the second set of frequency resources to the component 235-$b$ located in the zone 210, a third frequency resource from the third set of frequency resources to the component 235-$c$ located in the zone 215, a fourth frequency resource from the fourth set of frequency resources to the component 235-$d$ located in the zone 220, and a fifth frequency resource from the fifth set of frequency resources to the component 235-$e$ located in the zone 225.

In some examples, the scheduler 240 may coordinate the resources allocated to the different components 235 within the same zone such that different components 235 located in the same zone avoid using the same frequency resource from the set of frequency resources associated with the zone. As such, components 235 located in the same zone may transmit data or feedback to a central unit of the vehicle 230 without causing intra-vehicle interference. In some aspects, the scheduler 240 may coordinate the resources allocated to different components 235 within a zone or across different zones such that data from the antennas of the components 235 is received by the central unit of the vehicle 230 under low-latency conditions (e.g., to satisfy a low-latency communications timeline) while maintaining high reliability and quality of service (QoS) by allocating the resources appropriately (e.g., based on a prioritization of data or components 235, link quality characteristics, channel characteristics, etc.).

In some implementations, the scheduler 240 may associate the different sets of frequency resources with the different zones of the vehicle 230 to maximize the frequency separation between the components 235 located at opposite sides or ends of the vehicle 230. For example, the scheduler 240 may allocate the first set of frequency resources to components 235-$a$ in the zone 205 (associated with the right-hand side of the vehicle 230) and the third set of frequency resources to components 235-$c$ in the zone 215 (associated with the left-hand side of the vehicle 230) so that the frequency spacing between the first set of frequency resources and the third set of frequency resources is maximized. Similarly, the scheduler 240 may allocate the second set of frequency resources to components 235-$b$ in the zone 210 and the fourth set of frequency resources to components 235-$d$ in the zone 220 so that the frequency spacing between the second set of frequency resources and the fourth set of frequency resources is maximized. In some examples, the scheduler 240 or another processing unit of the vehicle 230 may determine a maximum frequency spacing between different sets of frequency resources based on the total frequency allocation for the vehicle 230, the quantity of the zones of the vehicle 230, and the quantity of pairs of opposites zones of the vehicle 230. For example, the scheduler 240 may determine that the quantity of zones of the vehicle 230 is equal to five and divide the total frequency allocation of the vehicle 230 into five sets of frequency resources (e.g., five frequency regions or bandwidths) accordingly, and may associate the five sets of frequency resources to the different zones such that the frequency spacing between sets of frequency resources allocated to components 235 on opposite sides or ends of the vehicle 230 is maximized. Further, the scheduler 240 may divide or partition the total frequency allocation of the vehicle 230 into a number of disjoint sets (such that some one or more frequencies within a set avoid overlapping or being common with a frequency of any other set) or into a number of sets that are not disjoint (such that some one or more frequencies within a set may potentially overlap or be common with a frequency of another set).

For instance, the scheduler 240 may divide the total frequency allocation of the vehicle 230 into five continuous blocks of frequency resources and may determine that the maximum frequency spacing that may be achieved is equal to one continuous block of frequency resources. In some aspects, the scheduler 240 may determine that the maximum frequency spacing is equal to one continuous block of frequency resources (e.g., one-fifth of the total frequency allocation of the vehicle 230) because there are two pairs of opposite sides or ends of the vehicle 230 and because a function (e.g., a floor function) of the quantity of sets of frequency resources divided by the quantity of pairs of opposite sides or ends is equal to 1. As such, the first set of frequency resources allocated to components 235-a in the zone 205 and the third set of frequency resources allocated to components 235-c in the zone 215 may be offset in frequency by at least one-fifth of the total frequency allocation of the vehicle 230 and the second set of frequency resources allocated to components 235-b in the zone 210 and the fourth set of frequency resources allocated to components 235-d in the zone 220 may be offset in frequency by at least one-fifth of the total frequency allocation of the vehicle 230.

Further, although the vehicle 230 is illustrated and described as including five zones, the vehicle 230 may include any number of zones without exceeding the scope of the present disclosure. For example, in some implementations, the vehicle 230 may include four zones including the zone 205, the zone 210, the zone 215, and the zone 220 and may refrain from designating the zone 225 (e.g., the vehicle 230 may include zones for sides or ends of the vehicle proximate to edges of vehicle 230). Further, although each zone is illustrated as including three components 235, a zone of the vehicle 230 may include any number of components 235.

In some examples, multiple vehicles may use the same process or logic for frequency allocation within their respective wireless in-vehicle networks such that the influence of inter-vehicle interference on any one of the multiple vehicles may be mitigated. For example, if multiple vehicles use the same process to allocate frequency resources within their respective wireless in-vehicle networks, one zone of one vehicle may be closest to (and therefore at risk of experiencing or causing inter-vehicle interference, or both) the opposite zone of another vehicle in examples in which both vehicles are oriented in the same direction and, based on implementing the described techniques, the components 235 of the opposite zones may be allocated frequency resources that are separated in frequency from each other by a maximum frequency spacing or by a frequency spacing that otherwise avoids, mitigates, or reduces interference or the likelihood for interference. Additional examples of mitigating inter-vehicle interference between vehicles that are oriented in the same direction are described in more detail herein, including with reference to FIG. 3.

In examples in which two vehicles are oriented in opposite directions (such that two same, non-opposite sides of the vehicles are nearest each other), the vehicles may exchange signaling or otherwise determine that one of the vehicles may flip its frequency allocations across opposite sides or ends of the vehicle so that frequency resources that are allocated to the components 235 of the zones of the two vehicles that are nearest to each other still maintain a maximum frequency spacing. Additional examples of mitigating inter-vehicle interference between opposing vehicles are described herein, including with reference to FIG. 4.

Figure 3:
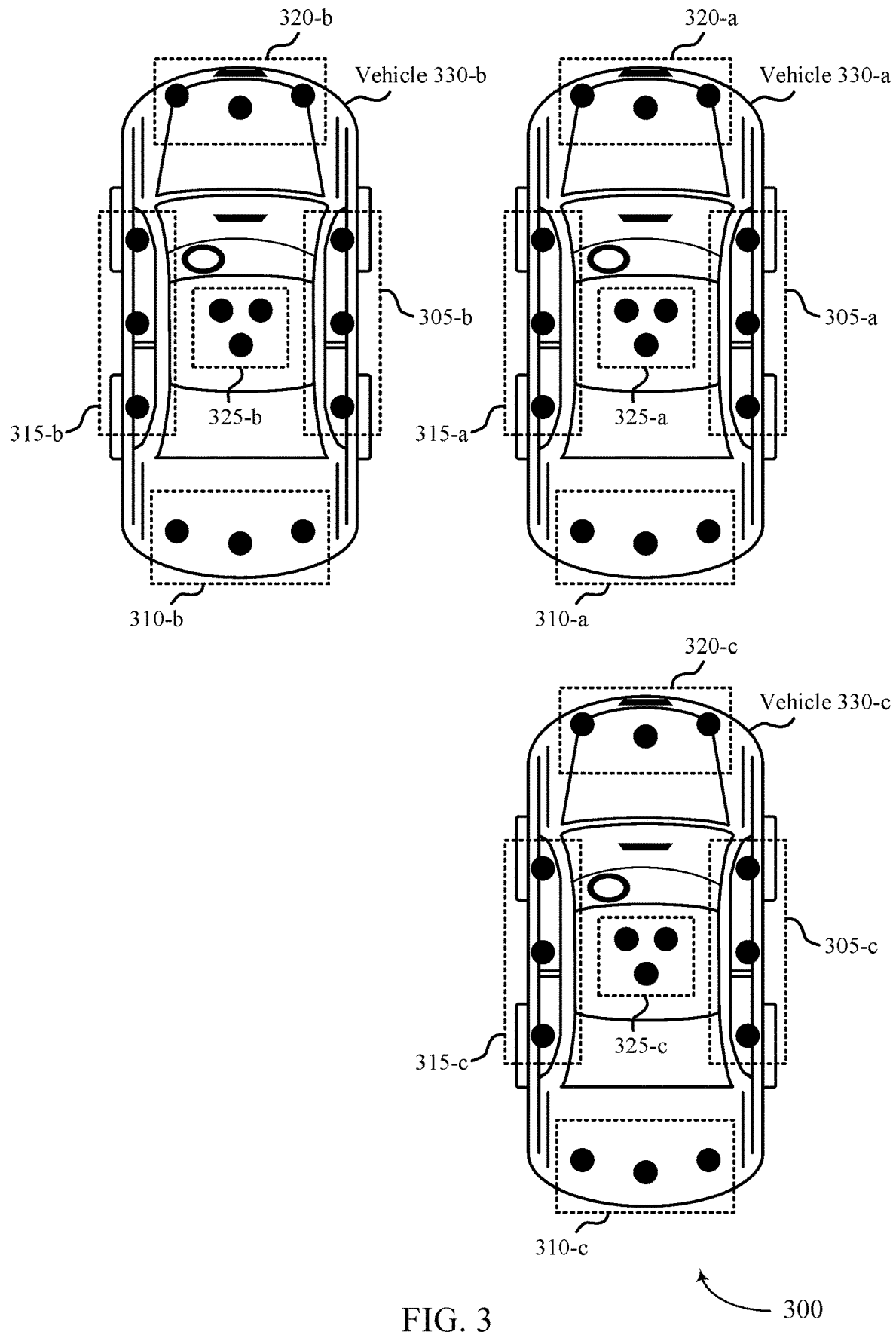
FIG. 3 illustrates an example of an inter-vehicle interference avoidance scheme that supports position-aware resource allocations for a wireless in-vehicle network in accordance with aspects of the present disclosure.

FIG. 3 illustrates an example of an inter-vehicle interference avoidance scheme 300 that supports position-aware resource allocations for a wireless in-vehicle network in accordance with aspects of the present disclosure. In some examples, the inter-vehicle interference avoidance scheme 300 may implement aspects of the wireless communications system 100 or the wireless in-vehicle network 200. The inter-vehicle interference avoidance scheme 300 includes a vehicle 330-a, a vehicle 330-b, and a vehicle 330-c that are driving or otherwise oriented in the same direction. Each vehicle 330 may include a number of components in a number of zones, where components of the same zone are allocated frequency resources from the set of frequency resources associated with that zone. In some implementations, each vehicle 330 may have the same or a similar total frequency allocation and may allocate sets of frequency resources from the total frequency allocation to different zones in the same or a similar manner.

For example, the vehicle 330-a, the vehicle 330-b, and the vehicle 330-c may each allocate a first set of frequency resources to components in the zone 305-a, the zone 305-b, and the zone 305-c, respectively, a second set of frequency resources to components in the zone 310-a, the zone 310-b, and the zone 310-c, respectively, a third set of frequency resources to components in the zone 315-a, the zone 315-b, and the zone 315-c, respectively, a fourth set of frequency resources to components in the zone 320-a, the zone 320-b, and the zone 320-c, respectively, and a fifth set of frequency resources to components in the zone 325-a, the zone 325-b, and the zone 325-c, respectively. Further, for each of the vehicles 330, the first set of frequency resources allocated to components in the zone 305 and the third set of frequency resources allocated to components in the zone 315 may be separated by a maximum frequency spacing or by a frequency spacing that otherwise avoids, mitigates, or reduces interference or the likelihood for interference. Similarly, for each of the vehicles 330, the second set of frequency resources allocated to components in the zone 310 and the fourth set of frequency resources allocated to components of the zone 320 may be separated by a maximum frequency spacing or by a frequency spacing that otherwise avoids, mitigates, or reduces interference or the likelihood for interference. Additional details relating to the allocation of the sets of frequency resources and the maximum frequency spacing are described herein, including with reference to FIG. 2.

The vehicles 330 may mitigate the inter-vehicle interference that each vehicle 330 may cause or experience, or both, based on allocating frequency resources to the components of the vehicles 330 based on the zone in which the components are located. For example, the vehicle 330-a and the vehicle 330-b may be driving or otherwise oriented next to each other, such that components located in the zone 315-a of the vehicle 330-a are nearest (and therefore at risk of causing or experiencing inter-vehicle interference, or both) to the components located in the zone 305-b of the vehicle 330-b. Based on implementing the described techniques, the components located in the zone 315-a of the vehicle 330-a may use frequency resources that are separated by a maximum or sufficient frequency spacing from the frequency resources that the components located in the zone 305-b of the vehicle 330-b may use, which may reduce or mitigate the influence that inter-vehicle interference will have on both of the vehicle 330-a and the vehicle 330-b. Additionally, based on a maximum transmit power associated with each component of the vehicle 330-*a* and the vehicle 330-*b*, inter-vehicle interference may be avoided between a component of the vehicle 330-*a* that is located beyond a threshold distance from a component of the vehicle 330-*b*. For instance, in the present example, the components located in the zone 315-*a* and the components located in the zone 305-*b* may be within the threshold distance and therefore identified to be potential sources or victims of inter-vehicle interference, while other components of the vehicle 330-*a* and the vehicle 330-*b* may not be within the threshold distance of components of the other vehicle.

In another example, the vehicle 330-*a* and the vehicle 330-*c* may be driving or otherwise oriented behind each other, such that components located in the zone 310-*a* of the vehicle 330-*a* are nearest (and therefore at risk of causing or experiencing inter-vehicle interference, or both) to the components located in the zone 320-*c* of the vehicle 330-*c*. Based on implementing the described techniques, the components located in the zone 310-*a* of the vehicle 330-*a* may use frequency resources that are separated by a maximum or sufficient frequency spacing from the frequency resources that the components located in the zone 320-*c* of the vehicle 330-*c* may use, which may reduce or mitigate the influence that inter-vehicle interference will have on both of the vehicle 330-*a* and the vehicle 330-*c*. Additionally, based on a maximum transmit power associated with each component of the vehicle 330-*a* and the vehicle 330-*c*, inter-vehicle interference may be avoided between a component of the vehicle 330-*a* that is located beyond a threshold distance from a component of the vehicle 330-*c*. For instance, in the present example, the components located in the zone 310-*a* and the components located in the zone 320-*c* may be within the threshold distance and therefore identified to be potential sources or victims of inter-vehicle interference, while other components of the vehicle 330-*a* and the vehicle 330-*c* may not be within the threshold distance of components of the other vehicle.

Figure 4:
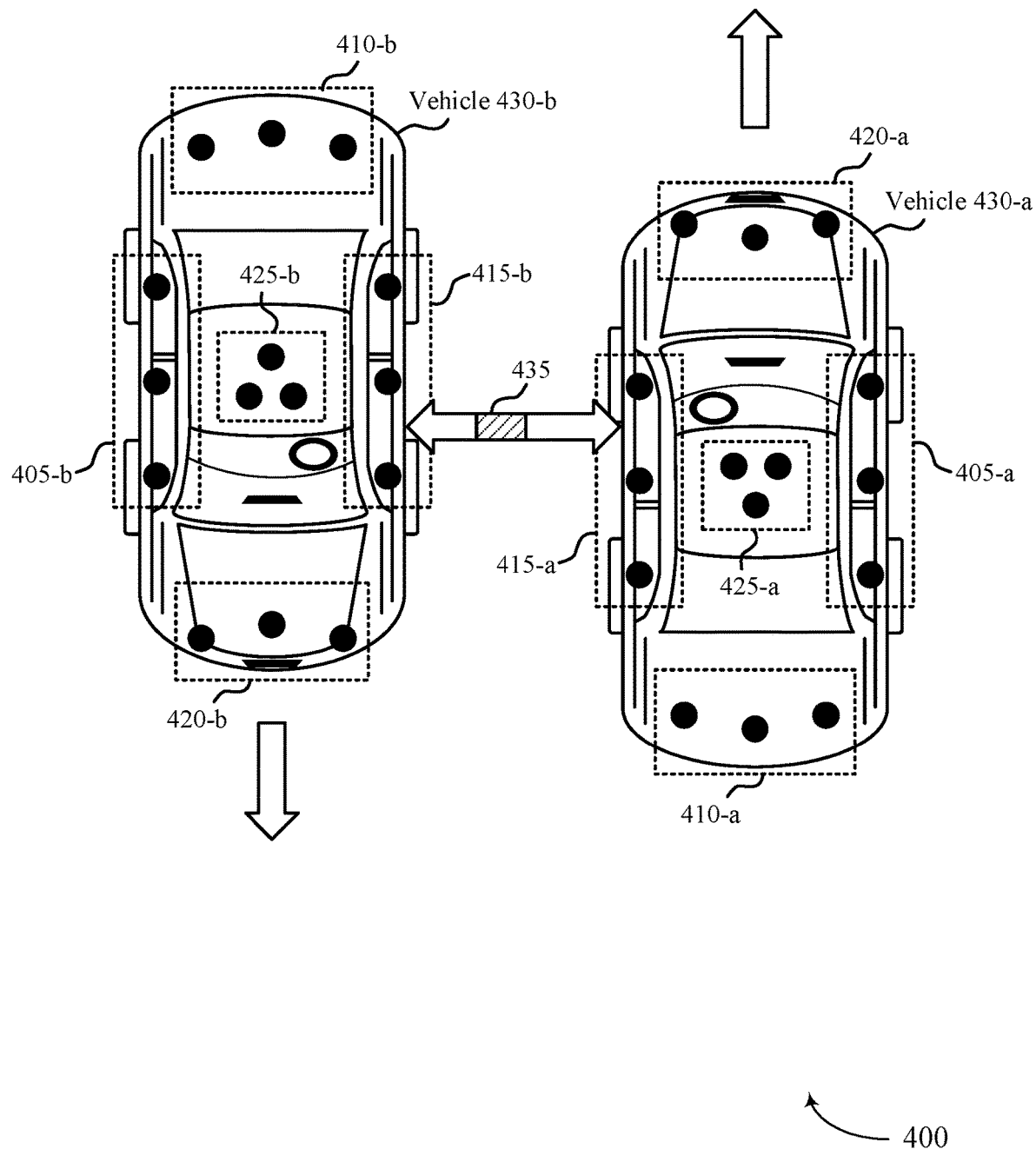
FIG. 4 illustrates an example of an inter-vehicle interference avoidance scheme that supports position-aware resource allocations for a wireless in-vehicle network in accordance with aspects of the present disclosure.

FIG. 4 illustrates an example of an inter-vehicle interference avoidance scheme 400 that supports position-aware resource allocations for a wireless in-vehicle network in accordance with aspects of the present disclosure. In some examples, the inter-vehicle interference avoidance scheme 400 may implement aspects of the wireless communications system 100 or the wireless in-vehicle network 200. The inter-vehicle interference avoidance scheme 400 may include a vehicle 430-*a* and a vehicle 430-*b* that are driving or otherwise oriented in opposite directions. Each vehicle 430 may include a number of components in a number of zones, where components of the same zone are allocated frequency resources from a set of frequency resources allocated for that zone. In some implementations, each vehicle 430 may have the same or a similar total frequency allocation and may allocate sets of frequency resources from the total frequency allocation to different zones in the same or a similar manner.

For example, the vehicle 430-*a* and the vehicle 430-*b* may each allocate a first set of frequency resources to components in the zone 405-*a* and the zone 405-*b*, respectively, a second set of frequency resources to components in the zone 410-*a* and the zone 410-*b*, respectively, a third set of frequency resources to components in the zone 415-*a* and the zone 415-*b*, respectively, a fourth set of frequency resources to components in the zone 420-*a* and the zone 420-*b*, respectively, and a fifth set of frequency resources to components in the zone 425-*a* and the zone 425-*b*, respectively. Further, for each of the vehicles 430, the first set of frequency resources allocated to components in the zone 405 and the third set of frequency resources allocated to components in the zone 415 may be separated by a maximum frequency spacing or by a frequency spacing that otherwise avoids, mitigates, or reduces interference or the likelihood for interference. Similarly, for each of the vehicles 430, the second set of frequency resources allocated to components in the zone 410 and the fourth set of frequency resources allocated to components of the zone 420 may be separated by a maximum frequency spacing or by a frequency spacing that otherwise avoids, mitigates, or reduces interference or the likelihood for interference. Additional details relating to the allocation of the sets of frequency resources and the maximum frequency spacing are described herein, including with reference to FIG. 2.

The vehicles 430 may mitigate the influence of inter-vehicle interference that each vehicle 430 may cause or experience, or both, based on coordinating on which vehicle 430 may adaptively or dynamically change its frequency resource allocations. In some examples, the vehicles 430 may coordinate on which of the vehicle 430-*a* or the vehicle 430-*b* may switch its frequency resource allocations based on determining that the zone 415-*a* of the vehicle 430-*a* is within a threshold distance of the zone 415-*b* of the vehicle 430-*b* and that the components of the zone 415-*a* of the vehicle 430-*a* use frequency resources within a threshold frequency range of the frequency resources used by components of the zone 415-*b* of the vehicle 430-*b* (or that the components of the zone 415-*a* and the components of the zone 415-*b* use the same frequency resources). In examples in which the vehicle 430-*a* and the vehicle 430-*b* determine that the zone 415-*a* is beyond a threshold distance of or sufficiently insulated from the zone 415-*b* (e.g., separated by a guard gap or separated by a barrier, such as a barrier that may be placed between opposing lanes of traffic), both the vehicle 430-*a* and the vehicle 430-*b* may refrain from switching their frequency resource allocations.

In some implementations, the vehicles 430 may communicate an interference coordination message 435 to signal or determine which vehicle 430 may switch its frequency resource allocations. In some aspects, a scheduler or another central unit of one of the vehicles 430 may transmit the interference coordination message 435 to a scheduler or another central unit of the other of the vehicles 430. In some examples, the interference coordination message 435 may explicitly indicate one of the vehicle 430-*a* or the vehicle 430-*b* and the indicated vehicle 430 may switch its frequency resource allocations. In some other examples, the interference coordination message 435 may indicate or be part of a configuration or a rule (e.g., an additional logic) for determining which of the vehicle 430-*a* and the vehicle 430-*b* will switch its frequency resource allocations. For example, the interference coordination message 435 may indicate which of the vehicle 430-*a* or the vehicle 430-*b* may switch its frequency resource allocations based on the levels of interference that each vehicle 430 measures. In another example, the vehicle 430-*a* and the vehicle 430-*b* may use cameras or sensors to detect the oncoming vehicle and, in some examples, the vehicle 430 that switches its frequency resource allocation may be based on which vehicle 430 detects an oncoming car first. In some aspects, the vehicle 430-*a* and the vehicle 430-*b* may communicate the interference coordination message 435 via a cellular V2X (C-V2X) communication link.

In some implementations, the vehicle 430-*a* may determine to adaptively change its frequency resource allocations. In some examples, the vehicle 430-*a* may swap the set of frequency resources used by components of the zone 415-*a* with the set of frequency resources used by components of the zone 405-*a*. For example, the components of the zone 415-*a* may initially use frequency resources from the third set of frequency resources and the components of the zone 405-*a* may initially use frequency resources from the first set of frequency resources and the scheduler of the vehicle 430-*a* may swap the frequency resource allocations such that the components of the zone 415-*a* use frequency resources from the first set of frequency resources and the components of the zone 405-*a* use frequency resources from the third set of frequency resources.

Accordingly, the components located in the zone 415-*a* of the vehicle 430-*a* may use frequency resources from the first set of frequency resources that are separated from the third set of frequency resources used by the components located in the zone 415-*b* of the vehicle 430-*b* (e.g., the vehicle 430-*b* may refrain from switching its frequency resource allocations) by the maximum or sufficient frequency spacing, which may reduce or mitigate the influence that inter-vehicle interference will have on both of the vehicle 430-*a* and the vehicle 430-*b*. Additionally, based on a maximum transmit power associated with each component of the vehicle 430-*a* and the vehicle 430-*b*, inter-vehicle interference may be avoided between a component of the vehicle 430-*a* that is located beyond a threshold distance from a component of the vehicle 430-*b*. For instance, in the present example, the components located in the zone 415-*a* and the components located in the zone 415-*b* may be within the threshold distance and therefore identified to be potential sources or victims of inter-vehicle interference, while other components of the vehicle 430-*a* and the vehicle 430-*b* may not be within the threshold distance of components of the other vehicle.

In examples in which the vehicle 430-*a* and the vehicle 430-*b* pass each other or otherwise no longer identify components that may be within a threshold distance of components of the other vehicle 430, the vehicle 430-*a* may determine whether to switch its frequency resource allocations back to the initial allocations or to maintain the current frequency resource allocations. In some examples, the vehicle 430-*a* may switch its frequency resource allocations back to the initial allocations after or as a result of identifying that the components located in the zone 415-*a* are unlikely to experience or cause inter-vehicle interference (e.g., immediately after the vehicle 430-*a* and the vehicle 430-*b* are no longer near or within a threshold distance of each other) or the vehicle 430-*a* may hold its current frequency resource allocations until sensing another nearby vehicle 430 or until receiving another interference coordination message 435 from another vehicle 430.

Figure 5:
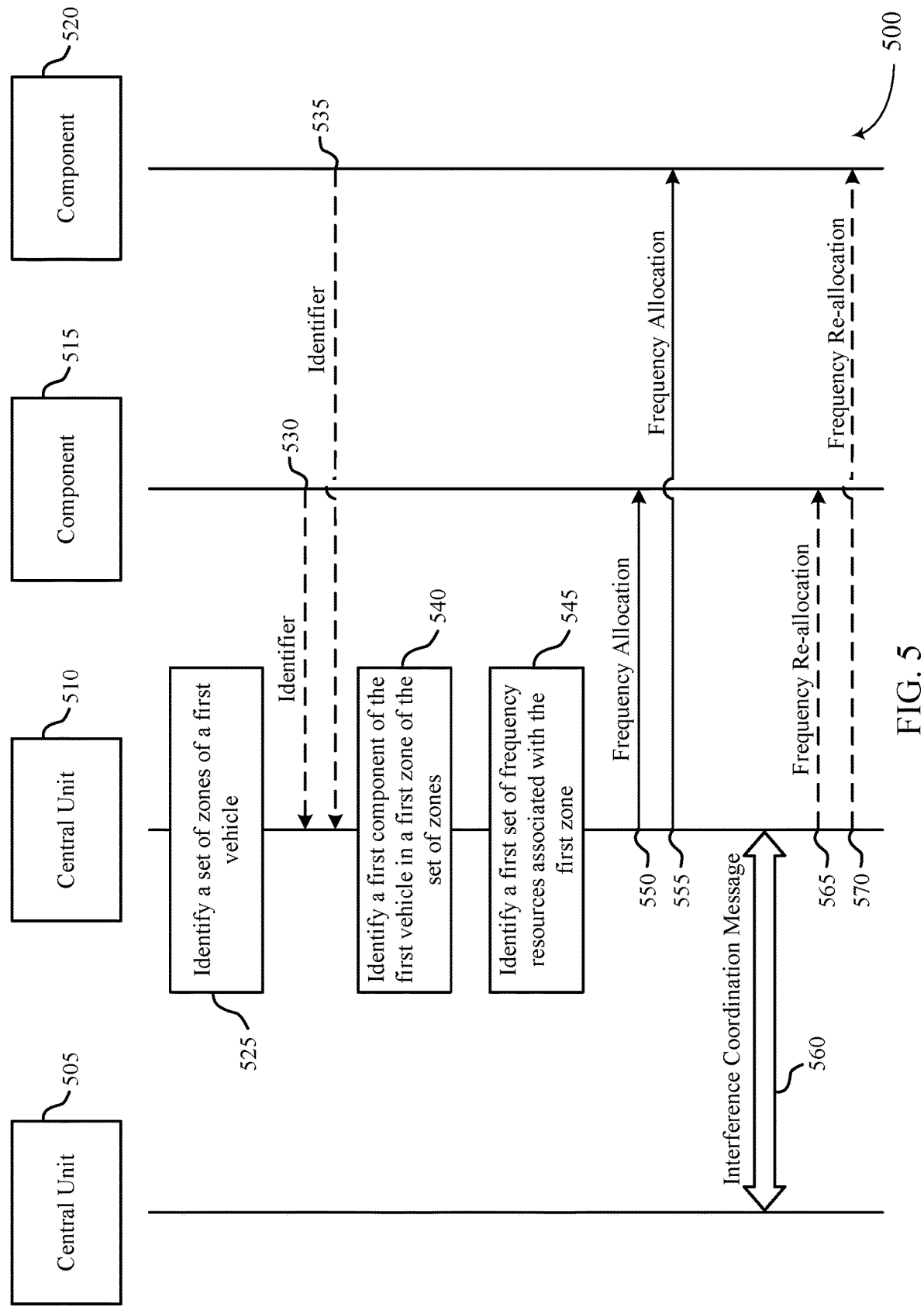
FIG. 5 illustrates an example of a process flow that supports position-aware resource allocations for a wireless in-vehicle network in accordance with aspects of the present disclosure.

FIG. 5 illustrates an example of a process flow 500 that supports position-aware resource allocations for a wireless in-vehicle network in accordance with aspects of the present disclosure. In some examples, the process flow 500 may implement aspects of the wireless communications system 100 or the wireless in-vehicle network 200. The process flow 500 may include a central unit 505, a central unit 510, a component 515, and a component 520. The central unit 505 and the central unit 510 may be examples of schedulers or other processing units of a vehicle and, in some examples, may communicate with each other over a C-V2X communication link. The central unit 510, the component 515, and the component 520 may be included within a first vehicle and the central unit 505 may be included with a second vehicle. In some examples, the central unit 510 may wirelessly communicate with the component 515 and the component 520 using frequency resources that are allocated based on the positions of the component 515 and the second component 520, respectively. Alternative examples of the following may be implemented, where some processes are performed in a different order than described or are not performed at all. In some implementations, processes may include additional features not mentioned below, or further processes may be added.

At 525, the central unit 510 may identify a set of zones of the first vehicle. In some examples, the set of zones may include a location or a region of the first vehicle and each zone of the set of zones may include a number of components of the first vehicle.

At 530, the component 515 may, in some implementations, transmit a message to the central unit 510 including an identifier associated with the component 515. At 535, the component 520 may, in some implementations, transmit a message to the central unit 510 including an identifier associated with the component 520. In some examples, the component 515 and the component 520 may transmit a message including an identifier upon being turned on or may transmit a message an identifier when the components transmit data to the central unit 510 (e.g., during the course of operation).

At 540, the central unit 510 may identify the first component (e.g., the component 515) of the first vehicle located in a first zone of the set of zones. In some examples, the central unit 510 may identify or otherwise determine that the component 515 is located in the first zone of the set of zones based on the identifier received at 530 and a mapping (e.g., based on a correspondence between the identifier received at the 530 and a location of the component 515 as defined by a table or a database). In some implementations, the central unit 510 may also identify a second component (e.g., the component 520) located in a second zone of the set of zones of the first vehicle. In some examples, the central unit 510 may identify or otherwise determine that the component 520 is located in the second zone of the set of zones based on the identifier received at 535 and the mapping.

At 545, the central unit 510 may identify a first set of frequency resources associated with the first zone. In some implementations, the central unit 510 may also identify a second set of frequency resources associated with the second zone.

At 550, the central unit 510 may allocate a first frequency resource from the first set of frequency resources to the first component (e.g., the component 515) for wireless transmissions within the wireless in-vehicle network based on the location of the component 515 being in the first zone. At 555, the central unit 510 may also allocate a second frequency resource from the second set of frequency resources to the second component (e.g., the component 520) for wireless transmissions within the wireless in-vehicle network based on the location of the component 520 being in the second zone. Accordingly, the component 515 may communicate with the central unit 510 using the first frequency resource from the first set of frequency resources and the component 520 may communicate with the central unit 510 using the second frequency resource from the second set of frequency resources. In some implementations, such frequency allocation to the different components of the first vehicle based on the location or position of the components may enable the central unit 510 to reduce or mitigate the inter-vehicle interference that the components of the first vehicle may experience or cause in the presence of other nearby vehicles that also support wireless in-vehicle networks. In some aspects, the first zone and the second zone may be associated with opposite sides or ends of the first vehicle and, as such, the first set of frequency resources may be separated in frequency from the second set of frequency resources by a maximum frequency spacing or by a frequency spacing that otherwise avoids, mitigates, or reduces interference or the likelihood for interference. Additional details relating to the allocation of frequency resources to components of different zones of the first vehicle are described herein, including with reference to FIG. 2.

At 560, the central unit 510 and the central unit 505 may communicate an interference coordination message. In some examples, the central unit 510 and the central unit 505 may communicate the interference coordination message based on determining that a second zone of the second vehicle (e.g., the vehicle in which the central unit 505 is located) is associated with a set of frequency resources within a threshold frequency range of the first set of frequency resources associated with the first zone of the first vehicle and determining that the second zone of the second vehicle is within a threshold distance of the first zone of the first vehicle (e.g., based on determining that the component 515 is likely to experience or cause inter-vehicle interference with one or more components of the second vehicle). Additional details relating to the interference coordination message are described herein, including with reference to FIG. 4.

At 565, the central unit 510 may, in some implementations, switch the set of frequency resources associated with the first zone from the first set of frequency resources to a different set of frequency resources based on the interference coordination message. In some implementations, the central unit 510 may determine to swap the set of frequency resources that are allocated to the first zone including the component 515 with the set of frequency resources that are allocated to the second zone including the component 520. For example, in implementations in which the first zone and the second zone are associated with opposite sides or ends of the first vehicle, the central unit 510 may swap their respective frequency allocations to change the frequency allocation associated with each zone by a sufficient amount (e.g., a maximum amount) to mitigate the influence of inter-vehicle interference.

As such, at 570, the central unit 510 may, in some implementations, switch the set of frequency resources associated with the second zone from the second set of frequency resources to the first set of frequency resources and, at 565, the central unit 510 may switch the set of frequency resources associated with the first zone from the first set of frequency resources to the second set of frequency resources. Such switching of frequency resources across opposite zones of the first vehicle may enable the first vehicle to reduce or mitigate the inter-vehicle interference experienced or caused by components of the first vehicle when the first vehicle and the second vehicle are oriented in opposite directions, as described in more detail with reference to FIG. 4.

Figure 6:
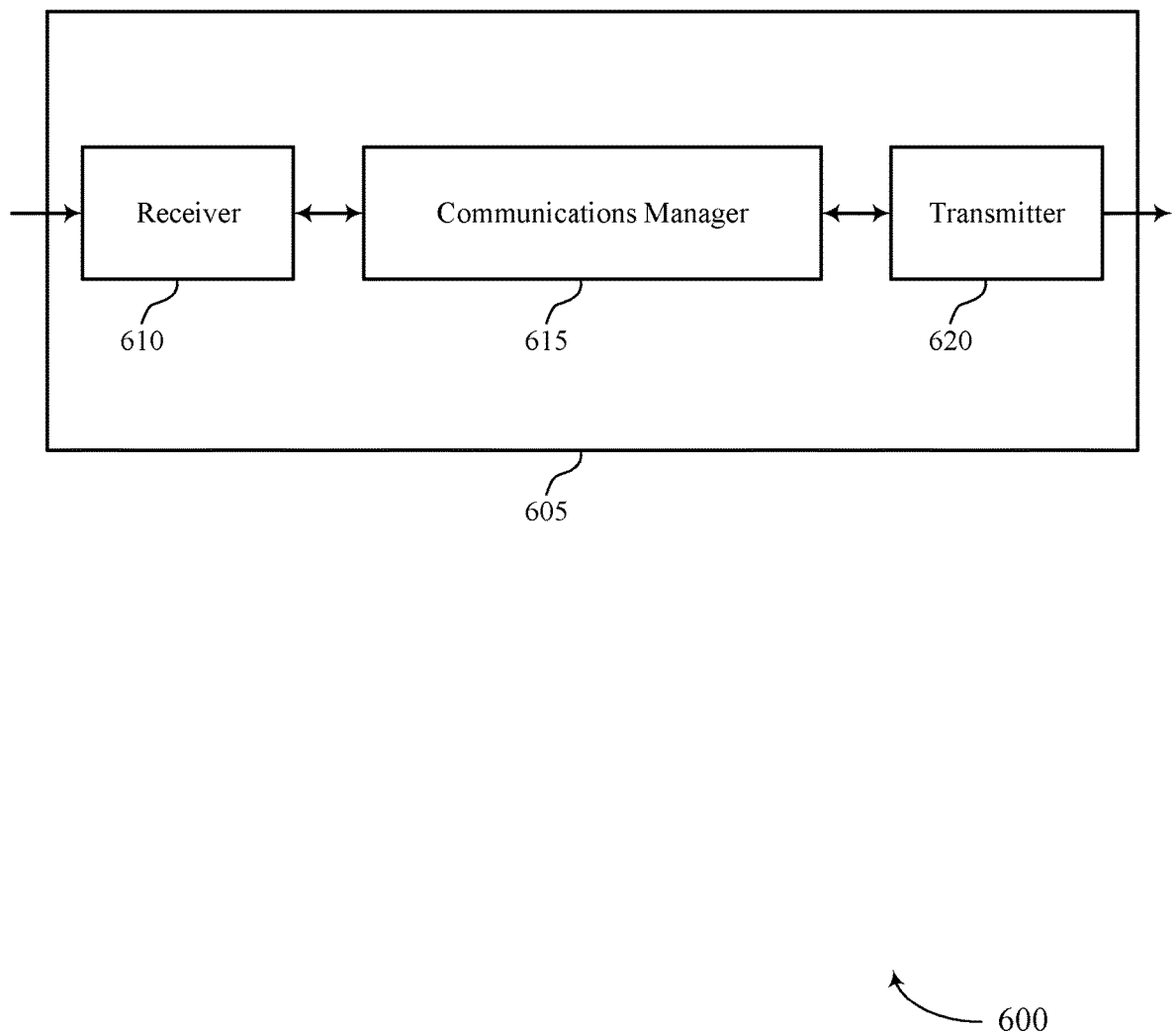
FIGS. 6 and 7 show block diagrams of devices that support position-aware resource allocations for a wireless in-vehicle network in accordance with aspects of the present disclosure.

FIG. 6 shows a block diagram 600 of a device 605 that supports position-aware resource allocations for a wireless in-vehicle network in accordance with aspects of the present disclosure. The device 605 may be an example of aspects of a vehicle, or a scheduler or central unit of a vehicle, as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to position-aware resource allocations for a wireless in-vehicle network, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a set of zones of a first vehicle, identify a first component of the first vehicle located in a first zone of the set of zones, where the first component is configured for wireless transmissions within a wireless in-vehicle network of the first vehicle, identify a first set of frequency resources associated with the first zone, and allocate a first frequency resource from the first set of frequency resources to the first component for wireless transmissions within the wireless in-vehicle network based on the first component being in the first zone. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. In some implementations of the present disclosure, the communications manager 615 may allocate frequency resources to different components of a device 605 (e.g., a vehicle) based on the position of the components to maximize the frequency separation between opposite sides or ends of the device 605. Based on implementing the techniques described herein, multiple nearby, potentially interfering vehicles may reduce or mitigate the inter-vehicle interference that each of the vehicles may experience or cause while also reducing the overall weight of the vehicles, improving the fuel efficiency of the vehicles, lowering the design complexity of the vehicles, reducing the labor and manufacturing costs of the vehicles, and reducing the complexity of vehicle services and repairs.

Further, in some examples, the communications manager 615, based on using the flexibility of the FDM air-interfaces to allocate frequency resources to different zones of the device 605, may reduce the directionality conditions of wireless components of a wireless in-vehicle network and, as such, may avoid or decrease the use of beamforming techniques and directional transmissions. By avoiding or decreasing the use of beamforming techniques and directional transmissions, the communications manager 615 may avoid powering one or more processing units associated with calculating beamforming weights and performing directional transmissions, which may improve power savings and increase the fuel efficiency of the device 605.

Figure 7:
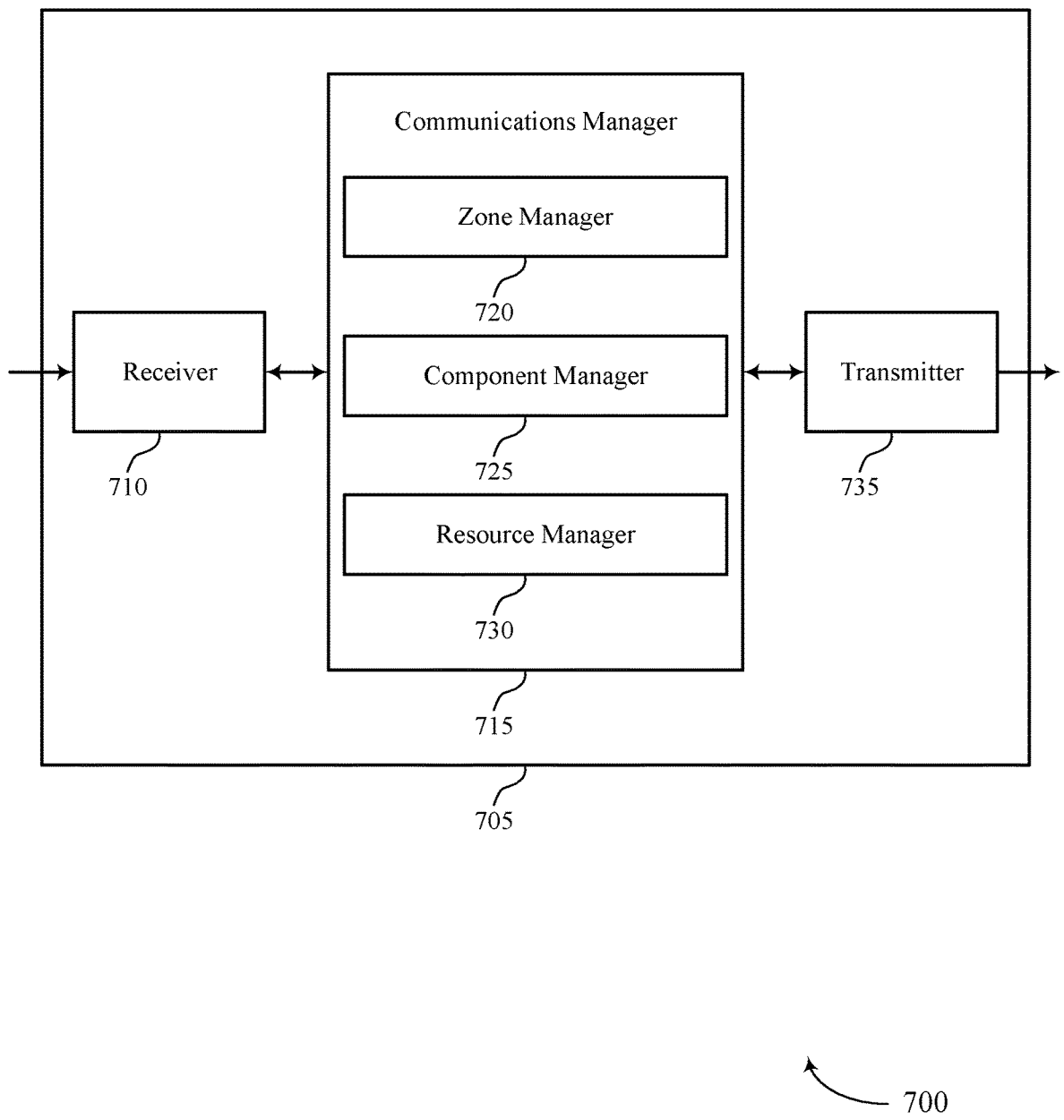

FIG. 7 shows a block diagram 700 of a device 705 that supports position-aware resource allocations for a wireless in-vehicle network in accordance with aspects of the present disclosure. The device 705 may be an example of aspects of a device 605 or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to position-aware resource allocations for a wireless in-vehicle network, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a zone manager 720, a component manager 725, and a resource manager 730. The communications manager 715 may be an example of aspects of the communications manager 910 described herein.

The zone manager 720 may identify a set of zones of a first vehicle. The component manager 725 may identify a first component of the first vehicle located in a first zone of the set of zones, where the first component is configured for wireless transmissions within a wireless in-vehicle network of the first vehicle. The resource manager 730 may identify a first set of frequency resources associated with the first zone and allocate a first frequency resource from the first set of frequency resources to the first component for wireless transmissions within the wireless in-vehicle network based on the first component being in the first zone.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
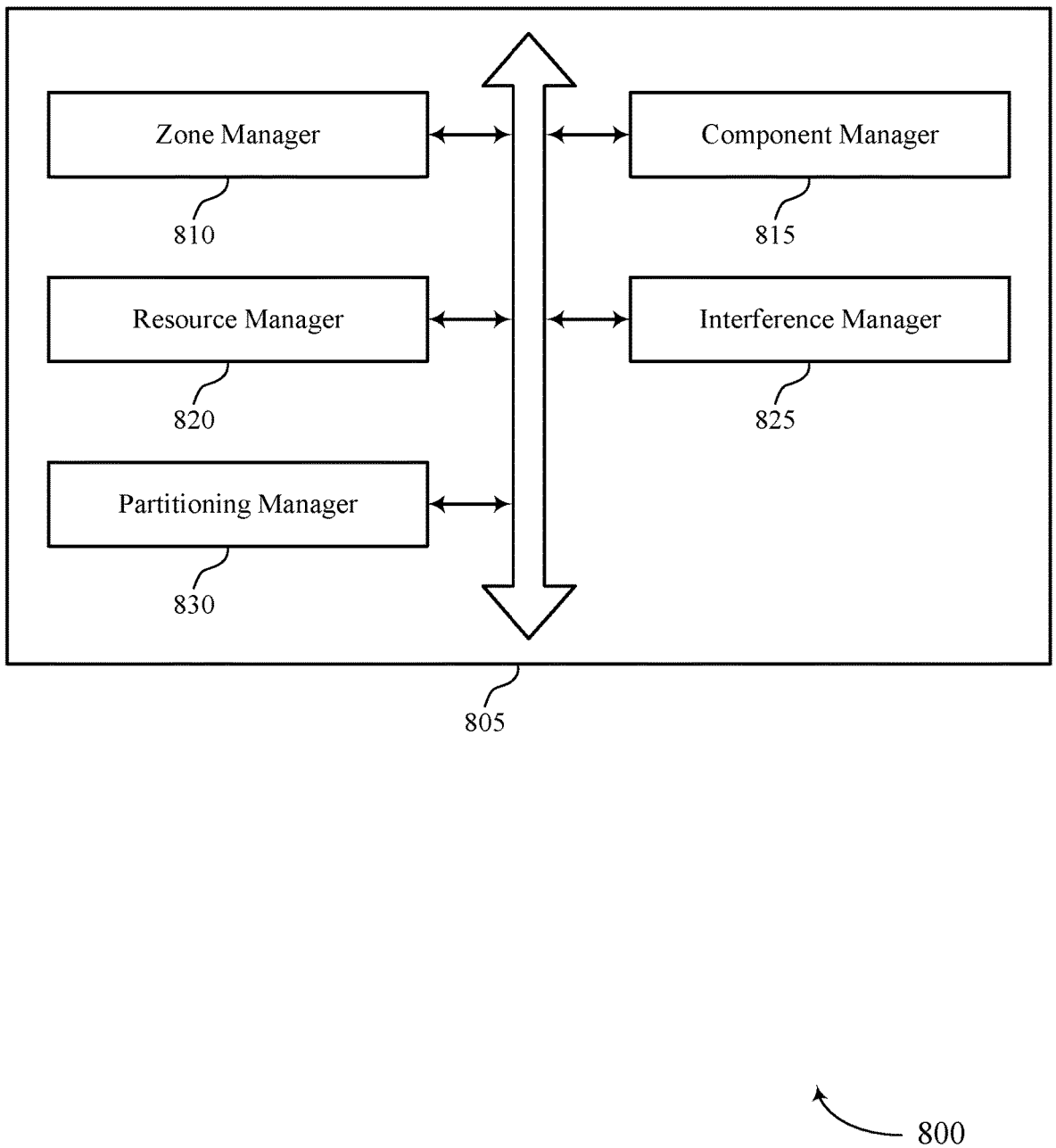
FIG. 8 shows a block diagram of a communications manager that supports position-aware resource allocations for a wireless in-vehicle network in accordance with aspects of the present disclosure.

FIG. 8 shows a block diagram 800 of a communications manager 805 that supports position-aware resource allocations for a wireless in-vehicle network in accordance with aspects of the present disclosure. The communications manager 805 may be an example of aspects of a communications manager 615, a communications manager 715, or a communications manager 910 described herein. The communications manager 805 may include a zone manager 810, a component manager 815, a resource manager 820, an interference manager 825, and a partitioning manager 830. Each of these modules may communicate, directly or indirectly, with one another (e.g., via one or more buses).

The zone manager 810 may identify a set of zones of a first vehicle. In some examples, the zone manager 810 may determine that the second zone of the second vehicle is within a threshold distance of the first zone of the first vehicle.

The component manager 815 may identify a first component of the first vehicle located in a first zone of the set of zones, where the first component is configured for wireless transmissions within a wireless in-vehicle network of the first vehicle. In some examples, the component manager 815 may identify a second component located in a second zone of the set of zones of the first vehicle, where the second component is configured for wireless transmissions within the wireless in-vehicle network of the first vehicle. In some examples, the component manager 815 may determine a first identifier associated with the first component.

In some examples, the component manager 815 may determine that the first component is located in the first zone of the first vehicle based on the first identifier and a mapping. In some examples, the component manager 815 may receive, from the first component, a message including the first identifier, where determining the first identifier associated with the first component is based on the message. In some cases, the device communicates with the first component of the first vehicle using the wireless in-vehicle network according to a frequency division multiplexing communication technique. In some cases, the first component includes a sensor, a camera, a streaming unit, or a radar device of the first vehicle.

The resource manager 820 may identify a first set of frequency resources associated with the first zone. In some examples, the resource manager 820 may allocate a first frequency resource from the first set of frequency resources to the first component for wireless transmissions within the wireless in-vehicle network based on the first component being in the first zone. In some examples, the resource manager 820 may identify a second set of frequency resources associated with the second zone.

In some examples, the resource manager 820 may allocate a second frequency resource from the second set of frequency resources to the second component for wireless transmissions within the wireless in-vehicle network based on the second component being in the second zone. In some examples, the resource manager 820 may identify the second set of frequency resources based on the maximum frequency spacing. In some examples, the resource manager 820 may identify a frequency allocation for the first vehicle and a quantity of the set of zones of the first vehicle.

In some examples, the resource manager 820 may determine that a second zone of a second vehicle is associated with a second set of frequency resources within a threshold frequency range of the first set of frequency resources associated with the first zone of the first vehicle. In some examples, the resource manager 820 may switch the set of frequency resources associated with the first zone from the first set of frequency resources to a third set of frequency resources based on the interference coordination message.

In some examples, the resource manager 820 may allocate a third frequency resource from the third set of frequency resources to the first component. In some examples, the resource manager 820 may refrain from switching the first set of frequency resources. The interference manager 825 may determine a maximum frequency spacing between the first set of frequency resources and the second set of frequency resources based on a frequency allocation for the first vehicle and a quantity of the set of zones of the first vehicle.

In some examples, the interference manager 825 may communicate an interference coordination message with the second vehicle based on determining that the second set of frequency resources associated with the second vehicle is within the threshold frequency range of the first set of frequency resources and that the second zone of the second vehicle is within the threshold distance of the first zone. In some examples, the interference manager 825 may identify the third set of frequency resources based on a maximum frequency spacing between the first set of frequency resources and the third set of frequency resources.

The partitioning manager 830 may partition the frequency allocation into a number of sets of frequency resources, where the number is equal to the quantity of the set of zones of the first vehicle and each set of frequency resources of the number of sets of frequency resources is associated with a zone of the set of zones of the first vehicle.

Figure 9:
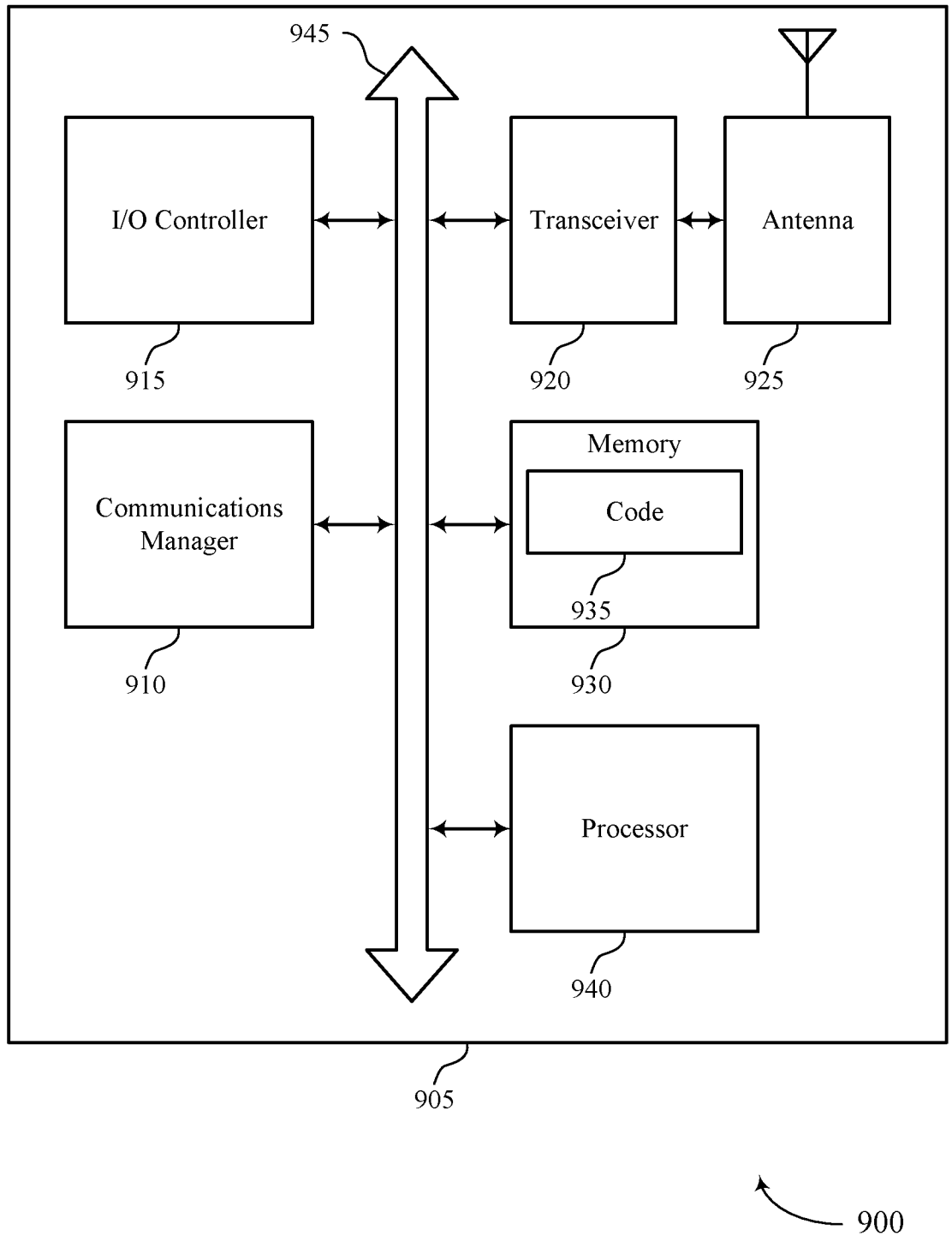
FIG. 9 shows a diagram of a system including a device that supports position-aware resource allocations for a wireless in-vehicle network in accordance with aspects of the present disclosure.

FIG. 9 shows a diagram of a system 900 including a device 905 that supports position-aware resource allocations for a wireless in-vehicle network in accordance with aspects of the present disclosure. The device 905 may be an example of or include the components of device 605, device 705, or a device as described herein. The device 905 may include components for bi-directional voice and data communications including components for transmitting and receiving communications, including a communications manager 910, an I/O controller 915, a transceiver 920, an antenna 925, memory 930, a processor 940, and a coding manager 950. These components may be in electronic communication via one or more buses (e.g., bus 945).

The communications manager 910 may identify a set of zones of a first vehicle, identify a first component of the first vehicle located in a first zone of the set of zones, where the first component is configured for wireless transmissions within a wireless in-vehicle network of the first vehicle, identify a first set of frequency resources associated with the first zone, and allocate a first frequency resource from the first set of frequency resources to the first component for wireless transmissions within the wireless in-vehicle network based on the first component being in the first zone.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting position-aware resource allocations for a wireless in-vehicle network).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
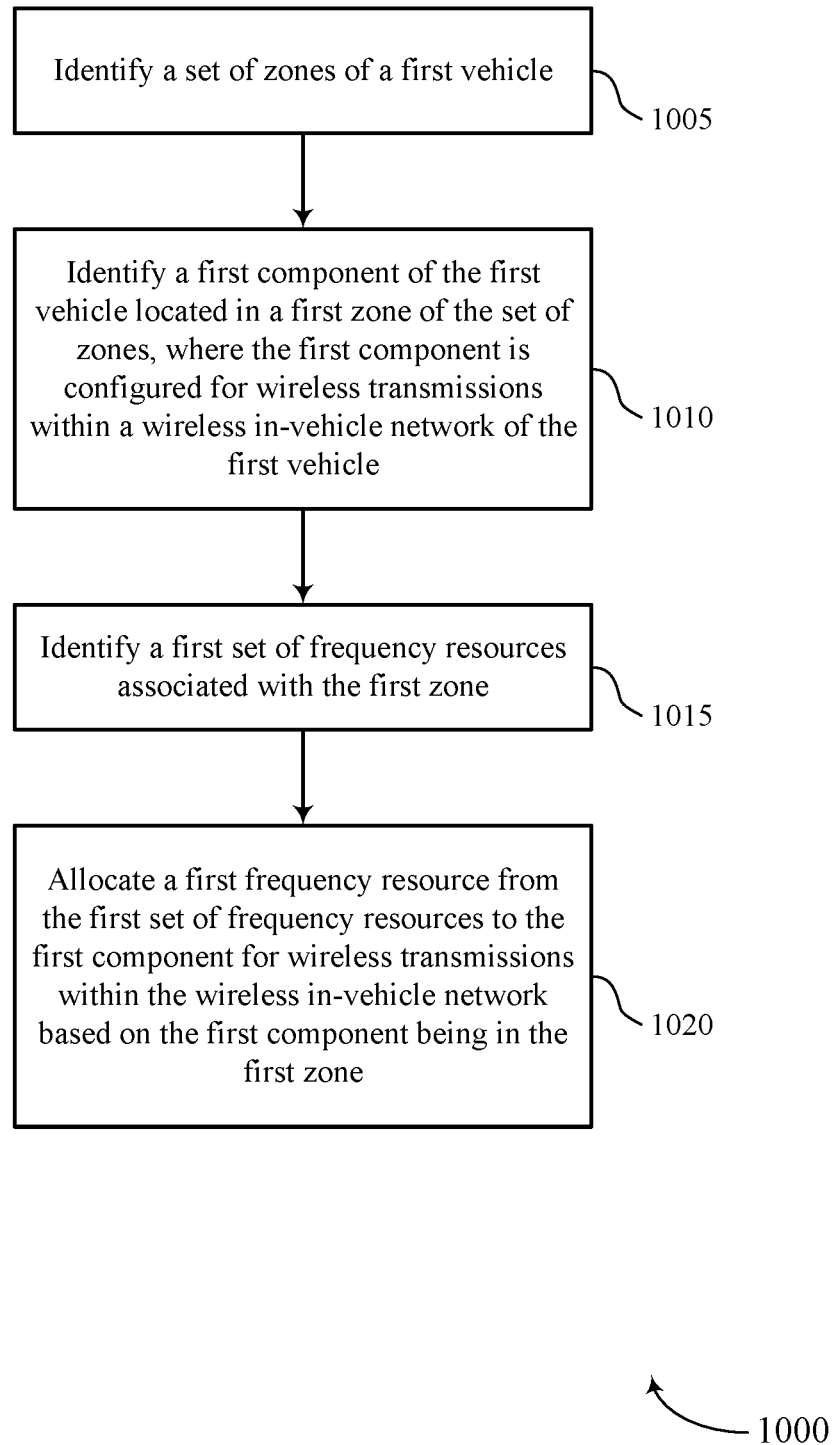
FIGS. 10 through 12 show flowcharts illustrating methods that support position-aware resource allocations for a wireless in-vehicle network in accordance with aspects of the present disclosure.

FIG. 10 shows a flowchart illustrating a method 1000 that supports position-aware resource allocations for a wireless in-vehicle network in accordance with aspects of the present disclosure. The operations of method 1000 may be implemented by a device or its components as described herein. For example, the operations of method 1000 may be performed by a communications manager as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1005, the device may identify a set of zones of a first vehicle. The operations of 1005 may be performed according to the methods described herein. In some examples, aspects of the operations of 1005 may be performed by a zone manager as described with reference to FIGS. 6 through 9.

At 1010, the device may identify a first component of the first vehicle located in a first zone of the set of zones, where the first component is configured for wireless transmissions within a wireless in-vehicle network of the first vehicle. The operations of 1010 may be performed according to the methods described herein. In some examples, aspects of the operations of 1010 may be performed by a component manager as described with reference to FIGS. 6 through 9.

At 1015, the device may identify a first set of frequency resources associated with the first zone. The operations of 1015 may be performed according to the methods described herein. In some examples, aspects of the operations of 1015 may be performed by a resource manager as described with reference to FIGS. 6 through 9.

At 1020, the device may allocate a first frequency resource from the first set of frequency resources to the first component for wireless transmissions within the wireless in-vehicle network based on the first component being in the first zone. The operations of 1020 may be performed according to the methods described herein. In some examples, aspects of the operations of 1020 may be performed by a resource manager as described with reference to FIGS. 6 through 9.

Figure 11:
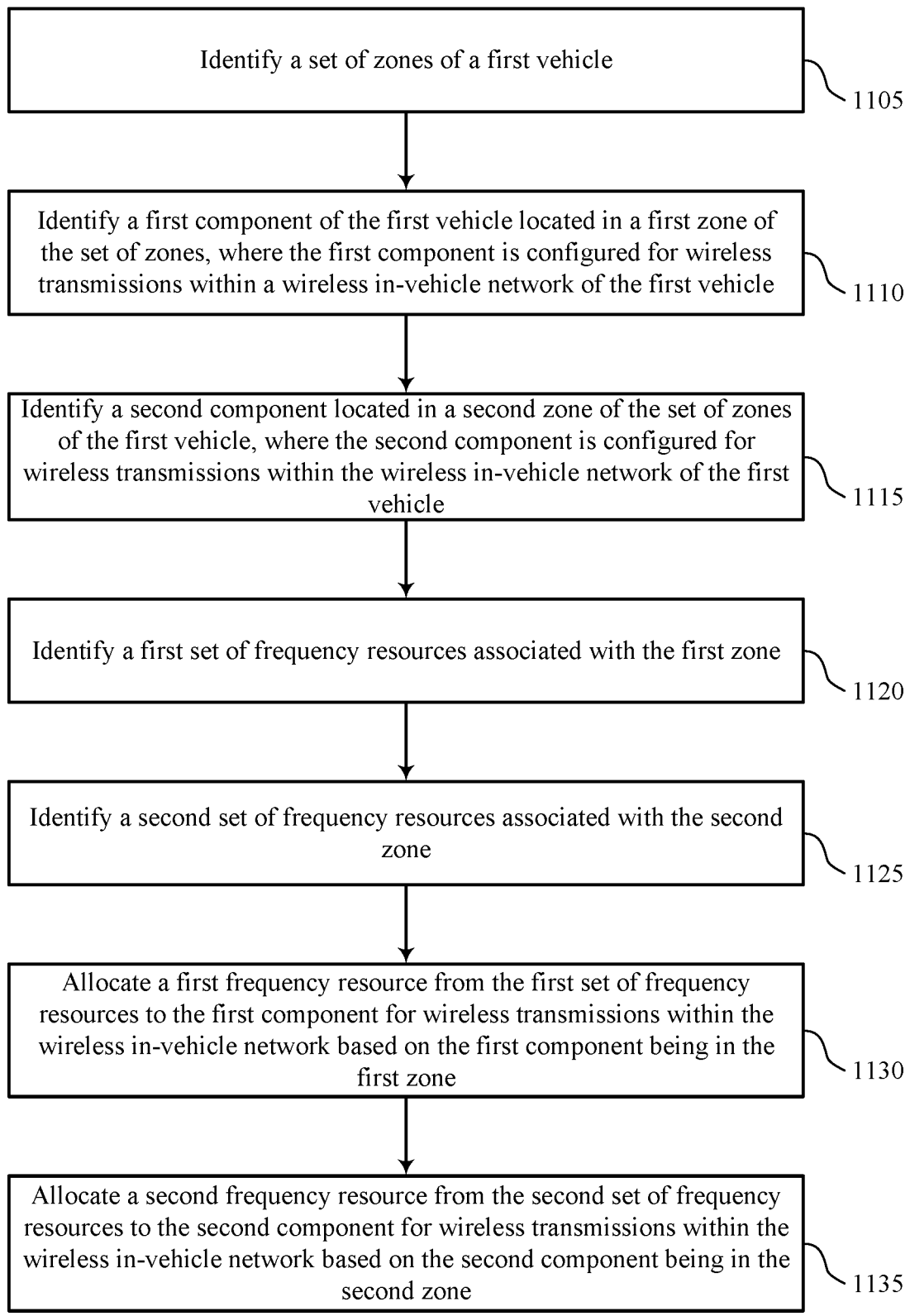

FIG. 11 shows a flowchart illustrating a method 1100 that supports position-aware resource allocations for a wireless in-vehicle network in accordance with aspects of the present disclosure. The operations of method 1100 may be implemented by a device or its components as described herein. For example, the operations of method 1100 may be performed by a communications manager as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1105, the device may identify a set of zones of a first vehicle. The operations of 1105 may be performed according to the methods described herein. In some examples, aspects of the operations of 1105 may be performed by a zone manager as described with reference to FIGS. 6 through 9.

At 1110, the device may identify a first component of the first vehicle located in a first zone of the set of zones, where the first component is configured for wireless transmissions within a wireless in-vehicle network of the first vehicle. The operations of 1110 may be performed according to the methods described herein. In some examples, aspects of the operations of 1110 may be performed by a component manager as described with reference to FIGS. 6 through 9.

At 1115, the device may identify a second component located in a second zone of the set of zones of the first vehicle, where the second component is configured for wireless transmissions within the wireless in-vehicle network of the first vehicle. The operations of 1115 may be performed according to the methods described herein. In some examples, aspects of the operations of 1115 may be performed by a component manager as described with reference to FIGS. 6 through 9.

At 1120, the device may identify a first set of frequency resources associated with the first zone. The operations of 1120 may be performed according to the methods described herein. In some examples, aspects of the operations of 1120 may be performed by a resource manager as described with reference to FIGS. 6 through 9.

At 1125, the device may identify a second set of frequency resources associated with the second zone. The operations of 1125 may be performed according to the methods described herein. In some examples, aspects of the operations of 1125 may be performed by a resource manager as described with reference to FIGS. 6 through 9.

At 1130, the device may allocate a first frequency resource from the first set of frequency resources to the first component for wireless transmissions within the wireless in-vehicle network based on the first component being in the first zone. The operations of 1130 may be performed according to the methods described herein. In some examples, aspects of the operations of 1130 may be performed by a resource manager as described with reference to FIGS. 6 through 9.

At 1135, the device may allocate a second frequency resource from the second set of frequency resources to the second component for wireless transmissions within the wireless in-vehicle network based on the second component being in the second zone. The operations of 1135 may be performed according to the methods described herein. In some examples, aspects of the operations of 1135 may be performed by a resource manager as described with reference to FIGS. 6 through 9.

Figure 12:
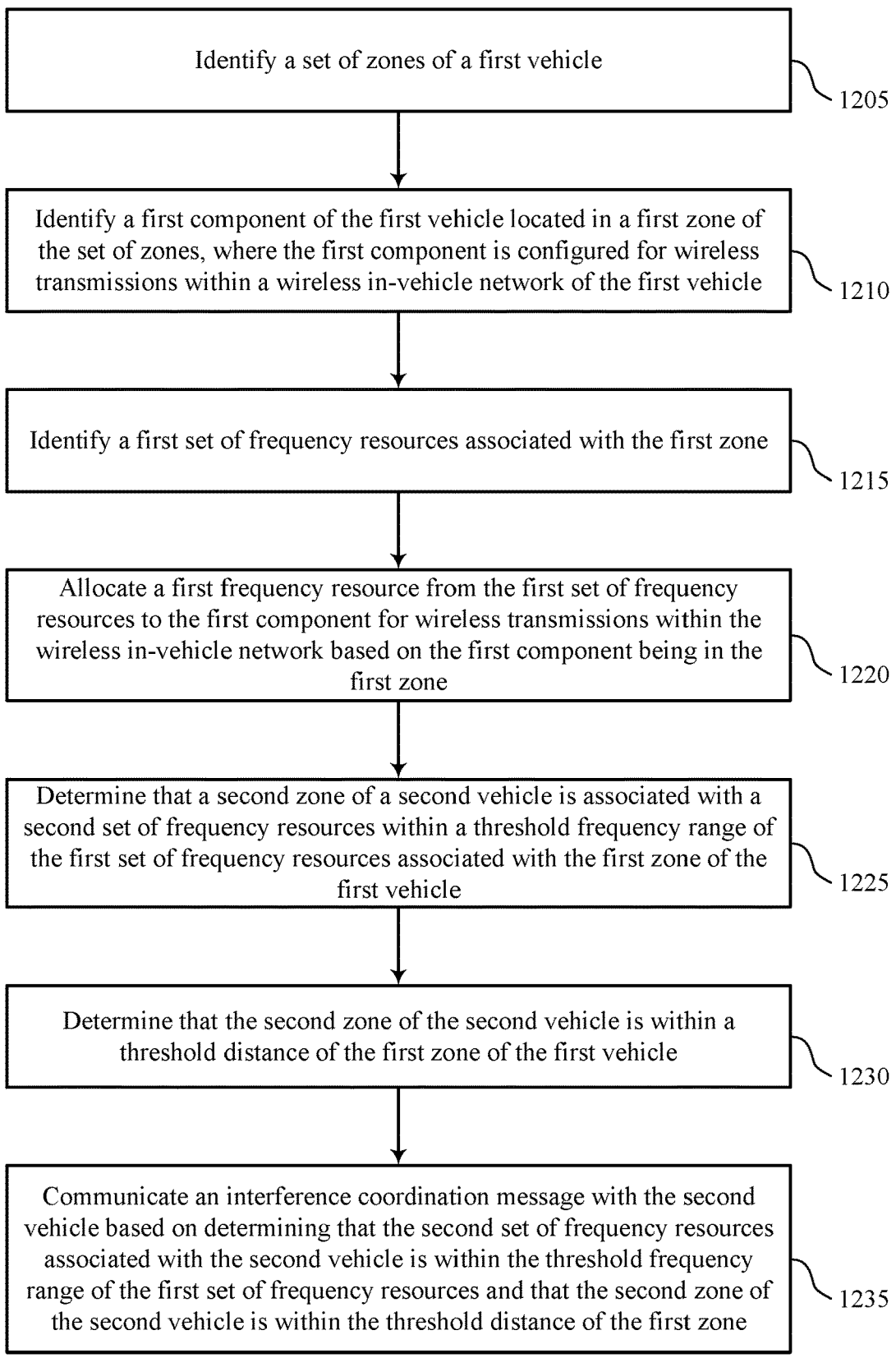

FIG. 12 shows a flowchart illustrating a method 1200 that supports position-aware resource allocations for a wireless in-vehicle network in accordance with aspects of the present disclosure. The operations of method 1200 may be implemented by a device or its components as described herein. For example, the operations of method 1200 may be performed by a communications manager as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1205, the device may identify a set of zones of a first vehicle. The operations of 1205 may be performed according to the methods described herein. In some examples, aspects of the operations of 1205 may be performed by a zone manager as described with reference to FIGS. 6 through 9.

At 1210, the device may identify a first component of the first vehicle located in a first zone of the set of zones, where the first component is configured for wireless transmissions within a wireless in-vehicle network of the first vehicle. The operations of 1210 may be performed according to the methods described herein. In some examples, aspects of the operations of 1210 may be performed by a component manager as described with reference to FIGS. 6 through 9.

At 1215, the device may identify a first set of frequency resources associated with the first zone. The operations of 1215 may be performed according to the methods described herein. In some examples, aspects of the operations of 1215 may be performed by a resource manager as described with reference to FIGS. 6 through 9.

At 1220, the device may allocate a first frequency resource from the first set of frequency resources to the first component for wireless transmissions within the wireless in-vehicle network based on the first component being in the first zone. The operations of 1220 may be performed according to the methods described herein. In some examples, aspects of the operations of 1220 may be performed by a resource manager as described with reference to FIGS. 6 through 9.

At 1225, the device may determine that a second zone of a second vehicle is associated with a second set of frequency resources within a threshold frequency range of the first set of frequency resources associated with the first zone of the first vehicle. The operations of 1225 may be performed according to the methods described herein. In some examples, aspects of the operations of 1225 may be performed by a resource manager as described with reference to FIGS. 6 through 9.

At 1230, the device may determine that the second zone of the second vehicle is within a threshold distance of the first zone of the first vehicle. The operations of 1230 may be performed according to the methods described herein. In some examples, aspects of the operations of 1230 may be performed by a zone manager as described with reference to FIGS. 6 through 9.

At 1235, the device may communicate an interference coordination message with the second vehicle based on determining that the second set of frequency resources associated with the second vehicle is within the threshold frequency range of the first set of frequency resources and that the second zone of the second vehicle is within the threshold distance of the first zone. The operations of 1235 may be performed according to the methods described herein. In some examples, aspects of the operations of 1235 may be performed by an interference manager as described with reference to FIGS. 6 through 9.

The following provides an overview of aspects of the present disclosure:

Aspect 1: A method for wireless communications at a device, comprising: identifying a plurality of zones of a first vehicle; identifying a first component of the first vehicle located in a first zone of the plurality of zones, wherein the first component is configured for wireless transmissions within a wireless in-vehicle network of the first vehicle; identifying a first set of frequency resources associated with the first zone; and allocating a first frequency resource from the first set of frequency resources to the first component for wireless transmissions within the wireless in-vehicle network based at least in part on the first component being in the first zone.

Aspect 2: The method of aspect 1, further comprising: identifying a second component located in a second zone of the plurality of zones of the first vehicle, wherein the second component is configured for wireless transmissions within the wireless in-vehicle network of the first vehicle; identifying a second set of frequency resources associated with the second zone; and allocating a second frequency resource from the second set of frequency resources to the second component for wireless transmissions within the wireless in-vehicle network based at least in part on the second component being in the second zone.

Aspect 3: The method of aspect 2, wherein the second zone is located at an opposite location of the first vehicle relative to the first zone, and wherein identifying the second set of frequency resources associated with the second zone comprises: determining a maximum frequency spacing between the first set of frequency resources and the second set of frequency resources based at least in part on a frequency allocation for the first vehicle and a quantity of the plurality of zones of the first vehicle; and identifying the second set of frequency resources based at least in part on the maximum frequency spacing.

Aspect 4: The method of any of aspects 1 through 3, wherein identifying the first set of frequency resources associated with the first zone comprises: identifying a frequency allocation for the first vehicle and a quantity of the plurality of zones of the first vehicle; and partitioning the frequency allocation into a number of sets of frequency resources, wherein the number is equal to the quantity of the plurality of zones of the first vehicle and each set of frequency resources of the number of sets of frequency resources is associated with a zone of the plurality of zones of the first vehicle.

Aspect 5: The method of any of aspects 1 through 4, further comprising: determining a first identifier associated with the first component; and determining that the first component is located in the first zone of the first vehicle based at least in part on the first identifier and a mapping.

Aspect 6: The method of aspect 5, further comprising: receiving, from the first component, a message including the first identifier, wherein determining the first identifier associated with the first component is based at least in part on the message.

Aspect 7: The method of any of aspects 1 through 6, further comprising: determining that a second zone of a second vehicle is associated with a second set of frequency resources within a threshold frequency range of the first set of frequency resources associated with the first zone of the first vehicle; determining that the second zone of the second vehicle is within a threshold distance of the first zone of the first vehicle; and communicating an interference coordination message with the second vehicle based at least in part on determining that the second set of frequency resources associated with the second vehicle is within the threshold frequency range of the first set of frequency resources and that the second zone of the second vehicle is within the threshold distance of the first zone.

Aspect 8: The method of aspect 7, wherein the interference coordination message includes an indication for the device to switch a set of frequency resources associated with the first zone of the first vehicle, the method further comprising: switching the set of frequency resources associated with the first zone from the first set of frequency resources to a third set of frequency resources based at least in part on the interference coordination message; and allocating a third frequency resource from the third set of frequency resources to the first component.

Aspect 9: The method of aspect 8, further comprising: identifying the third set of frequency resources based at least in part on a maximum frequency spacing between the first set of frequency resources and the third set of frequency resources.

Aspect 10: The method of aspect 7, wherein the interference coordination message includes an indication for the second vehicle to switch a set of frequency resources associated with the second zone of the second vehicle, the method further comprising: refraining from switching the first set of frequency resources.

Aspect 11: The method of any of aspects 1 through 10, wherein the device communicates with the first component of the first vehicle using the wireless in-vehicle network according to an FDM communication technique.

Aspect 12: The method of any of aspects 1 through 11, wherein the first component comprises a sensor, a camera, a streaming unit, or a radar device of the first vehicle.

Aspect 13: An apparatus for wireless communications at a device, comprising a processor; memory coupled with the processor; and instructions stored in the memory and executable by the processor to cause the apparatus to perform a method of any of aspects 1 through 12.

Aspect 14: An apparatus for wireless communications at a device, comprising at least one means for performing a method of any of aspects 1 through 12.

Aspect 15: A non-transitory computer-readable medium storing code for wireless communications at a device, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a control unit of a first vehicle, comprising:

identifying a plurality of zones within the first vehicle, the plurality of zones within the first vehicle including a first zone within the first vehicle and a second zone within the first vehicle;

determining a frequency spacing between a first set of frequency resources allocated for the first zone and a second set of frequency resources allocated for the second zone based at least in part on a frequency allocation for the first vehicle and a quantity of the plurality of zones within the first vehicle;

allocating, to a first component of the first vehicle located in the first zone, a first frequency resource from the first set of frequency resources based at least in part on the first component being in the first zone and, to a second component of the first vehicle located in the second zone, a second frequency resource from the second set of frequency resources based at least in part on the second component being in the second zone; and communicating with the first component using the first frequency resource and with the second component using the second frequency resource.

2. The method of claim 1, wherein the second zone is located at an opposite location of the first vehicle relative to the first zone, and wherein determining the frequency spacing further comprises:

determining a maximum frequency spacing between the first set of frequency resources and the second set of frequency resources based at least in part on the frequency allocation for the first vehicle and the quantity of the plurality of zones within the first vehicle, wherein the second set of frequency resources is allocated to the second zone based at least in part on the maximum frequency spacing.

3. The method of claim 2, wherein the second zone is located at the opposite location of the first vehicle relative to the first zone in accordance with:

the first zone being associated with a right-hand side of the first vehicle and the second zone being associated with a left-hand side of the first vehicle; or the first zone being associated with a front-end of the first vehicle and the second zone being associated with a back-end of the first vehicle.

4. The method of claim 1, further comprising:

identifying the frequency allocation for the first vehicle and the quantity of the plurality of zones within the first vehicle; and partitioning the frequency allocation into a number of sets of frequency resources, wherein the number of sets is equal to the quantity of the plurality of zones within the first vehicle and each respective set of frequency resources of the number of sets of frequency resources is associated with a respective zone of the plurality of zones within the first vehicle.

5. The method of claim 1, further comprising:

determining a first identifier associated with the first component; and determining that the first component is located in the first zone of the first vehicle based at least in part on the first identifier and a mapping.

6. The method of claim 5, further comprising:

receiving, from the first component, a message including the first identifier, wherein determining the first identifier associated with the first component is based at least in part on the message.

7. The method of claim 1, further comprising:

determining that a zone within a second vehicle is associated with a set of frequency resources within a threshold frequency range of the first set of frequency resources associated with the first zone within the first vehicle;

determining that the zone within the second vehicle is within a threshold distance of the first zone within the first vehicle; and communicating an interference coordination message with the second vehicle based at least in part on determining that the set of frequency resources associated with the second vehicle is within the threshold frequency range of the first set of frequency resources and that the zone within the second vehicle is within the threshold distance of the first zone.

8. The method of claim 7, wherein the interference coordination message includes an indication for the control unit to switch from the first set of frequency resources associated with the first zone within the first vehicle, the method further comprising:

switching from the first set of frequency resources associated with the first zone to a third set of frequency resources based at least in part on the interference coordination message; and allocating a third frequency resource from the third set of frequency resources to the first component.

9. The method of claim 8, further comprising:

identifying the third set of frequency resources based at least in part on a maximum frequency spacing between the first set of frequency resources and the third set of frequency resources.

10. The method of claim 7, wherein the interference coordination message includes an indication for the second vehicle to switch from the set of frequency resources associated with the zone within the second vehicle, the method further comprising:

refraining from switching from the first set of frequency resources.

11. The method of claim 1, wherein the control unit communicates with the first component and the second component using a wireless in-vehicle network according to a frequency division multiplexing communication technique.

12. The method of claim 1, wherein the first component or the second component comprises a sensor, a camera, a streaming unit, or a radar device of the first vehicle.

13. An apparatus for wireless communications at a control unit of a first vehicle, comprising:

a processor, memory coupled with the processor; and instructions stored in the memory and executable by the processor to cause the apparatus to:

identify a plurality of zones within the first vehicle, the plurality of zones within the first vehicle including a first zone within the first vehicle and a second zone within the first vehicle;

determine a frequency spacing between a first set of frequency resources allocated for the first zone and a second set of frequency resources allocated for the second zone based at least in part on a frequency allocation for the first vehicle, a quantity of the plurality of zones within the first vehicle;

allocate, to a first component of the first vehicle located in the first zone, a first frequency resource from the first set of frequency resources based at least in part on the first component being in the first zone and, to a second component of the first vehicle located in the second zone, a second frequency resource from the second set of frequency resources based at least in part on the second component being in the second zone; and communicate with the first component using the first frequency resource and with the second component using the second frequency resource.

14. The apparatus of claim 13, wherein the second zone is located at an opposite location of the first vehicle relative to the first zone, and wherein, to determine the frequency spacing, the instructions are further executable by the processor to cause the apparatus to:

determine a maximum frequency spacing between the first set of frequency resources and the second set of frequency resources based at least in part on the frequency allocation for the first vehicle and the quantity of the plurality of zones within the first vehicle, wherein the second set of frequency resources is allocated to the second zone based at least in part on the maximum frequency spacing.

15. The apparatus of claim 14, wherein the second zone is located at the opposite location of the first vehicle relative to the first zone in accordance with:

the first zone being associated with a right-hand side of the first vehicle and the second zone being associated with a left-hand side of the first vehicle; or the first zone being associated with a front-end of the first vehicle and the second zone being associated with a back-end of the first vehicle.

16. The apparatus of claim 13, wherein the instructions are executable by the processor to cause the apparatus to:

identify the frequency allocation for the first vehicle and the quantity of the plurality of zones within the first vehicle; and partition the frequency allocation into a number of sets of frequency resources, wherein the number of sets is equal to the quantity of the plurality of zones within the first vehicle and each respective set of frequency resources of the number of sets of frequency resources is associated with a respective zone of the plurality of zones within the first vehicle.

17. The apparatus of claim 13, wherein the instructions are further executable by the processor to cause the apparatus to:

determine a first identifier associated with the first component; and determine that the first component is located in the first zone of the first vehicle based at least in part on the first identifier and a mapping.

18. The apparatus of claim 17, wherein the instructions are further executable by the processor to cause the apparatus to:

receive, from the first component, a message including the first identifier, wherein determining the first identifier associated with the first component is based at least in part on the message.

19. The apparatus of claim 13, wherein the instructions are further executable by the processor to cause the apparatus to:

determine that a zone within a second vehicle is associated with a set of frequency resources within a threshold frequency range of the first set of frequency resources associated with the first zone within the first vehicle;

determine that the zone within the second vehicle is within a threshold distance of the first zone within the first vehicle; and communicate an interference coordination message with the second vehicle based at least in part on determining that the set of frequency resources associated with the second vehicle is within the threshold frequency range of the first set of frequency resources and that the zone within the second vehicle is within the threshold distance of the first zone.

20. The apparatus of claim 17, wherein the interference coordination message includes an indication for the control unit to switch from the first set of frequency resources associated with the first zone within the first vehicle, and the instructions are further executable by the processor to cause the apparatus to:

switch from the first set of frequency resources associated with the first zone to a third set of frequency resources based at least in part on the interference coordination message; and allocate a third frequency resource from the third set of frequency resources to the first component.

21. The apparatus of claim 20, wherein the instructions are further executable by the processor to cause the apparatus to:

identify the third set of frequency resources based at least in part on a maximum frequency spacing between the first set of frequency resources and the third set of frequency resources.

22. The apparatus of claim 19, wherein the interference coordination message includes an indication for the second vehicle to switch from the set of frequency resources associated with the zone within the second vehicle, and wherein the instructions are further executable by the processor to cause the apparatus to:

refrain from switching from the first set of frequency resources.

23. The apparatus of claim 13, wherein the control unit communicates with the first component and the second component using a wireless in-vehicle network according to a frequency division multiplexing communication technique.

24. The apparatus of claim 13, wherein the first component or the second component comprises a sensor, a camera, a streaming unit, or a radar device of the first vehicle.

25. An apparatus for wireless communications at a control unit of a first vehicle, comprising:

means for identifying a plurality of zones within the first vehicle, the plurality of zones within the first vehicle including a first zone within the first vehicle and a second zone within the first vehicle;

means for determining a frequency spacing between a first set of frequency resources allocated for the first zone and a second set of frequency resources allocated for the second zone based at least in part on a frequency allocation for the first vehicle and a quantity of the plurality of zones within the first vehicle;

means for allocating, to a first component of the first vehicle located in the first zone, a first frequency resource from the first set of frequency resources based at least in part on the first component being in the first zone and, to a second component of the first vehicle located in the second zone, a second frequency resource from the second set of frequency resources based at least in part on the second component being in the second zone; and means for communicating with the first component using the first frequency resource and with the second component using the second frequency resource.

26. The apparatus of claim 25, wherein the second zone is located at an opposite location of the first vehicle relative to the first zone, and wherein, to determine the frequency spacing, the apparatus further comprises:

means for determining a maximum frequency spacing between the first set of frequency resources and the second set of frequency resources based at least in part on the frequency allocation for the first vehicle and the quantity of the plurality of zones within the first vehicle, wherein the second set of frequency resources is allocated to the second zone based at least in part on the maximum frequency spacing.

27. The apparatus of claim 26, wherein the second zone is located at the opposite location of the first vehicle relative to the first zone in accordance with:

the first zone being associated with a right-hand side of the first vehicle and the second zone being associated with a left-hand side of the first vehicle; or the first zone being associated with a front-end of the first vehicle and the second zone being associated with a back-end of the first vehicle.

28. A non-transitory computer-readable medium storing code for wireless communications at a control unit of a first vehicle, the code comprising instructions executable by a processor to:

identify a plurality of zones within the first vehicle, the plurality of zones within the first vehicle including a first zone within the first vehicle and a second zone within the first vehicle;

determine a frequency spacing between a first set of frequency resources allocated for the first zone and a second set of frequency resources allocated for the second zone based at least in part on a frequency allocation for the first vehicle and a quantity of the plurality of zones within the first vehicle;

allocate, to a first component of the first vehicle located in the first zone, a first frequency resource from the first set of frequency resources based at least in part on the first component being in the first zone and, to a second component of the first vehicle located in the second zone, a second frequency resource from the second set of frequency resources based at least in part on the second component being in the second zone; and communicate with the first component using the first frequency resource and with the second component using the second frequency resource.

29. The non-transitory computer-readable medium of claim 28, wherein the second zone is located at an opposite location of the first vehicle relative to the first zone, and wherein, to determine the frequency spacing, the code comprises instructions further executable by the processor to:

determine a maximum frequency spacing between the first set of frequency resources and the second set of frequency resources based at least in part on the frequency allocation for the first vehicle and the quantity of the plurality of zones within the first vehicle, wherein the second set of frequency resources is allocated to the second zone based at least in part on the maximum frequency spacing.

30. The non-transitory computer-readable medium of claim 29, wherein the second zone is located at the opposite location of the first vehicle relative to the first zone in accordance with:

the first zone being associated with a right-hand side of the first vehicle and the second zone being associated with a left-hand side of the first vehicle; or the first zone being associated with a front-end of the first vehicle and the second zone being associated with a back-end of the first vehicle.

\* \* \* \* \*